US010860196B1

(12) United States Patent
Nichoson et al.

(10) Patent No.: US 10,860,196 B1
(45) Date of Patent: Dec. 8, 2020

(54) EDIT EXPERIENCE FOR TRANSFORMATION OF DIGITAL CONTENT

(71) Applicant: Adobe Inc., San Jose, CA (US)

(72) Inventors: Mark Eric Nichoson, Palo Alto, CA (US); Edward Christopher Wright, Minneapolis, MN (US); Christopher James Gammon, Waunakee, WI (US); Christian Thomas Cantrell, Sterling, VA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/509,982

(22) Filed: Jul. 12, 2019

(51) Int. Cl.
G06F 3/048 (2013.01)
G06F 3/0484 (2013.01)
G06F 3/0481 (2013.01)
G06K 9/62 (2006.01)

(52) U.S. Cl.
CPC ........ *G06F 3/04847* (2013.01); *G06F 3/0481* (2013.01); *G06K 9/6215* (2013.01)

(58) Field of Classification Search
CPC .... G06F 3/04847; G06F 3/0481; G06F 3/048; G06K 9/6215
See application file for complete search history.

(56) References Cited

U.S. PATENT DOCUMENTS

| 2009/0231352 | A1* | 9/2009 | Bhatt | G06F 3/04847 345/581 |
| 2013/0120439 | A1* | 5/2013 | Harris | G06T 13/80 345/619 |
| 2013/0329994 | A1* | 12/2013 | Webb | G09G 5/02 382/167 |
| 2015/0347858 | A1* | 12/2015 | Johnson | G06F 3/04847 382/311 |
| 2020/0073858 | A1* | 3/2020 | Maeda | G06T 11/001 |

* cited by examiner

*Primary Examiner* — Jeanette J Parker
(74) *Attorney, Agent, or Firm* — SBMC

(57) ABSTRACT

Techniques for edit experience for transformation of digital content are delivered in a digital medium environment. According to various implementations, an image editor system receives edits to a digital image to transform the digital image and generate an edited image. An edit experience is then generated that is presentable to recreate the image transformation process. The image editor system outputs the edit experience to enable a user to interact with the edit experience to reproduce the image transformation, such as via a step-by-step process. In at least some implementations, edits to a particular digital image are saved as presets that can be suggested for editing other images, such as images that are determined to be similar to an edited image.

20 Claims, 20 Drawing Sheets

EDIT EXPERIENCE FOR TRANSFORMATION OF DIGITAL CONTENT

BACKGROUND

A variety of different systems are available for creating and editing digital content, such as images, video, audio, multimedia, and so forth. For instance, image editing systems enable users to manipulate various attributes of digital images to generate customized versions of digital images. Examples attributes of digital images that can be manipulated include color (e.g., white balance), contrast, content (e.g., via object insertion or removal), aspect ratio, and so forth.

While conventional image editing systems enable a wide variety of digital image attributes to be customized, they lack the ability to provide clear and reproducible explanations of how a particular digital image was manipulated to produce a customized digital image. For instance, consider a scenario where a user interacts with an image editing system to manipulate different attributes of a digital image and generate a customized version of the digital image. A different user then views the customized digital image and wishes to know how the original image was modified to generate the customized digital image. In a conventional image editing system, the user that created the customized image would typically be required to provide a manual walk-through of the image editing process to explain to the different user how the various editing steps were performed to generate the customized digital image. Further, the editing user may make mistakes in explaining the editing process, such as if the editing process was particularly complex. Thus, conventional image editing systems require a considerable time expenditure on an editing user's part to explain to other users how a particular customized digital image was generated.

In addition to requiring considerable human resources, such conventional image editing systems consume excessive system resources as well. For instance, processor and memory resources that would otherwise be available for other computing tasks may be relegated to the repetitive task of responding to user input while an editing user is presenting a manual walk-through of the editing process, thus causing these resources to be less available or unavailable for other computing tasks. Thus, techniques utilized by conventional image editing systems for enabling image editing processes to be explained and recreated are inefficient both from a user workflow perspective, and from a system resources perspective.

SUMMARY

To overcome these problems, techniques for edit experience for transformation of digital content are delivered in a digital medium environment. According to various implementations, an image editor system receives edits to a digital image to transform the digital image and generate an edited image. An edit experience is then generated that is presentable to recreate the image transformation process. The image editor system outputs the edit experience to enable a user to interact with the edit experience to reproduce the image transformation, such as via a step-by-step process. In at least some implementations, edits to a particular digital image are saved as presets that can be suggested for editing other images, such as images that are determined to be similar to an edited image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
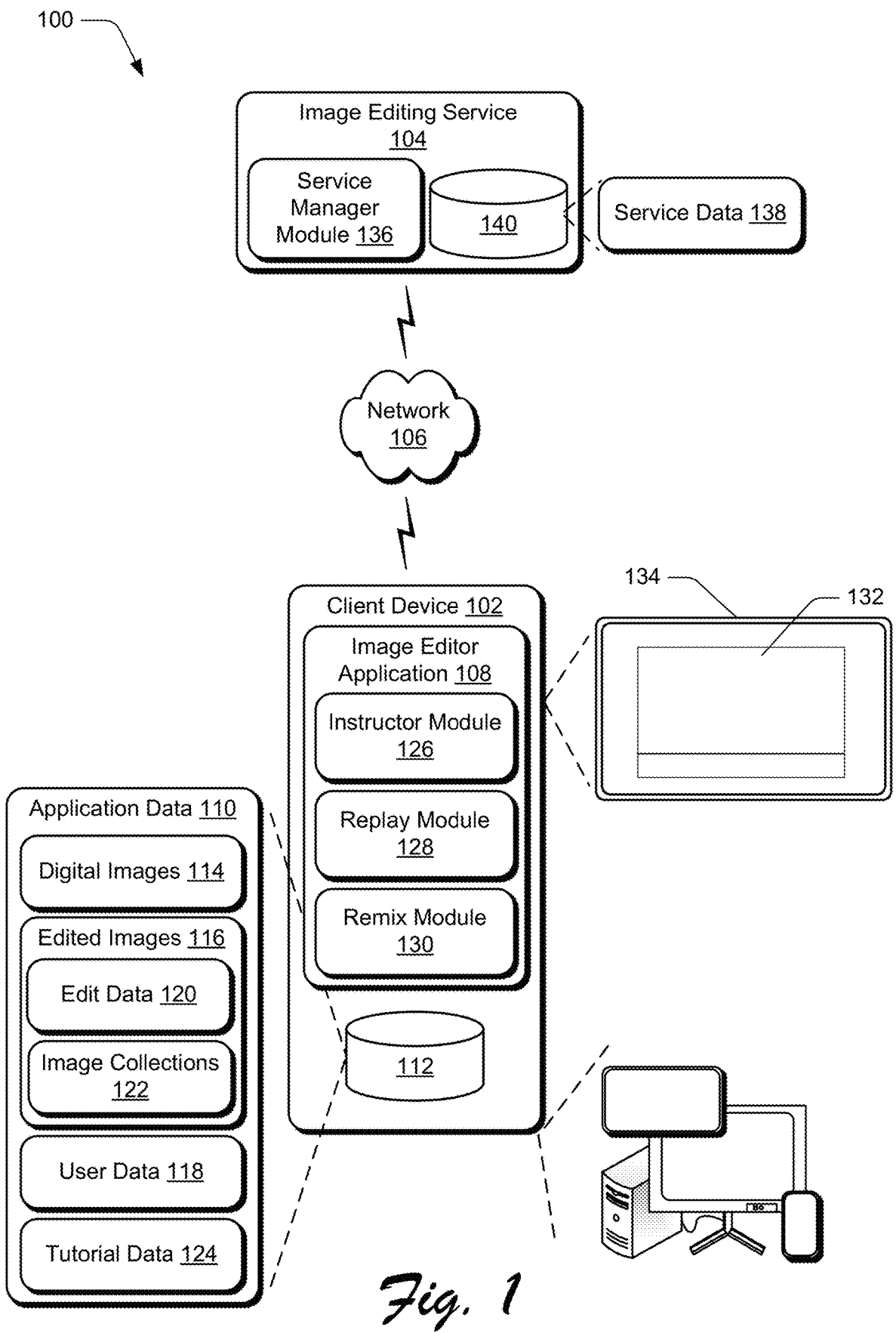
FIG. 1 is an illustration of an environment in an example implementation that is operable to employ techniques described herein.

Conventional content editing systems that provide image editing functionality enable a user to apply various edits to a digital image to generate an edited version of the digital image. Such conventional systems, however, do not typically provide functionality for efficiently and intuitively demonstrating how an edited image was generated from a source image. Thus, conventional content editing systems are burdensome on user and system resources by requiring extensive user interaction to explain how a particular digital image was edited, and by preventing system resources (e.g., processor and memory bandwidth) allocated to the manual processes from being available for other system tasks.

To overcome these drawbacks with conventional content editing systems, techniques for edit experience for transformation of digital content are implemented in a digital medium environment. For instance, a user leverages an image editor application to apply edits to various attributes of a source digital image and to generate an edited version of the source image. As part of applying the edits, the editing user manipulates different editing controls in a graphical user interface (GUI) of the image editor application. The image editor application tracks the different edits and control manipulations and generates edit data that describes the edits and control manipulations. The edit data can then be utilized to generate different edit experiences that explain how the source image was transformed to generate the edited image. The editing user, for example, provides input requesting that an edit experience be generated such that other users can interact with the edit experience to discover how the edited image was generated.

Consider now that a different user encounters the edited image, such as while interacting with the image editor GUI to view images served via a network-based image sharing service. The user wishes to know how the edited image was generated, and thus selects an option from the image editor GUI to engage in an edit experience pertaining to the edited image. In at least one implementation, the image editor application provides different types of edit experiences that vary in an amount and/or type of user interaction utilized during the edit experiences. For instance, a hands-on edit experience is offered that provides a step-by-step visual editing process that allows user interaction at each step. A replay edit experience is also offered that provides a walk-through of the image editing process and that generally affords less user interactivity than the hands-on experience.

Accordingly, the image editor application generates output that presents the image editing experience utilizing the image editor GUI. For example, the image editor application populates the source image to the image editor GUI, and applies the edit data to configure edit controls of the image editor GUI to present a before and after representation of the edit controls. The edit controls, for instance, are configured to include a default indicator that visually identifies a position of each control prior to image edits being applied, and an edit indicator that visually identifies a position of each edit control after edits are applied to generate the edit image. Thus, as part of presenting the edit experience, each edit control is manipulated from the default position to the edit position to cause the source image to be transformed into the edited image. For example, as part of a hands-on edit experience, the user is prompted at each step to manipulate a respective edit control, and the edit experience proceeds in response to the user manipulation of each edit control. In the replay edit experience, manipulation of certain of the edit controls may be automated, such as by the image editor application applying the edit data to automatically manipulate each edit control from the default position to the edit position. Accordingly, the user is presented with an efficient and intuitive edit experience that explains how the edit image was generated from the source image.

In at least some implementations, the image editor application can transition between different edit experiences, such as based on express or implied user behaviors indicating an edit experience transition. For instance, while a particular type of edit experience is in process (e.g., a replay edit experience), a user provides input requesting a transition to a different type of edit experience, e.g., a hands-on edit experience. The input may be based on an express request, such as user selection of a transition control to transition between experiences. Alternatively or additionally, image editor application may cause the transition based on a request implied from a user behavior, such as the user manipulating an edit control during a playback edit experience. Generally, this enables a user to customize an edit experience while the edit experience is in progress.

The described implementations also enable edit settings generated from an edited image to be utilized as edit presets for editing other digital images. For instance, consider the edit data described above that is generated based on editing operations applied to generate the edited image. The edit data can be utilized to generate a set of edit presets that describe which visual attributes of the source image were edited, and to what extent the visual attributes were edited. The edit presets are generated as a portable data set that can be retrieved and applied to other digital images to cause visual attributes of the other images to be transformed similarly to those of the edited image. This enables other users who may wish to similarly edit other images to obtain the edit presets and cause the edit presets to be automatically applied as a set to other digital images.

Implementations may also be employed to suggest edits to a digital image based on edits applied to other, similar digital images. For instance, consider that a user inputs a digital image for editing to the image editor application. The image editor application compares the input image to a collection of source images to identify a source image that is visually similar to the input image. Generally, visual similarity may be based on similarity of different visual attributes, such as visual objects included in the images, color, contrast, temperature, and so on. The image editor application then retrieves an edited image that represents an edited version of the similar image, and suggests edits to the input image using edit data from the edited version of the similar image. For instance, the image editor application applies edit settings from the edit data to the input image to generate a suggested edit to the input image. The user may accept the suggested edit to cause an edited version of the input image to be generated using the edit data.

In this way, techniques for edit experience for transformation of digital content provide automated processes for generating and outputting edit experiences for digital content. By providing automated step-by-step explanations of how visual attributes of digital content are modified to transform the digital content, the disclosed techniques greatly reduce the number of user interactions and system resources required to enable in comparison with conventional content editing systems. Thus, a more efficient content editor experience is provided that conserves system resources as well as user time and interaction required to discover how digital content is generated.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques for edit experience for transformation of digital content described herein. The illustrated environment 100 includes a client device 102 and an image editing service system ("image editing service") 104 that are communicatively coupled, one to another, via a network 106.

Computing devices that are usable to implement the client device 102 and the image editing service 104 may be configured in a variety of ways, such as a desktop computer, a laptop computer, a mobile device (e.g., using a handheld configuration such as a tablet or mobile phone), a server device, and so forth. Additionally, the computing device may be representative of a plurality of different devices, such as multiple servers utilized by a business to perform operations "over the cloud" as further described in relation to FIG. 20.

The client device 102 includes an image editor application 108 that is representative of functionality to perform various editing interactions with digital images, such as for generating and transforming digital images. As part of enabling digital images to be transformed, the image editor application 108 maintains application data 110 stored on a local storage 112. Further, the application data 110 includes digital images 114, edited digital images ("edited images") 116, and user data 118. The digital images 114 are representative of various instances of visual digital content, and may be implemented in a variety of different digital image formats. The digital images 114, for instance, may take various forms, such as photographs, drawings, digitized versions of analog images, videos, animations, and so forth.

The edited images 116 represent versions of the digital images 114 that are transformed in different ways, such as via user interaction with the image editor application 108 to edit various attributes of the digital images 114 and generate the edited images 116. The edited images 116 are associated with edit data 120 that identifies various ways in which the digital images 114 are edited to generate the edited images 116. For instance, each edited image 116 includes a respective instance of the edit data 120 that identifies how a respective digital image 114 was modified to generate the edited image 116.

In at least one implementation, the image editor application 108 enables the digital images 114 to be edited in a non-destructive way such that the original form of the digital images 114 are preserved when edited, and edits are recorded as the edit data 120. Thus, instances of the edited images 116 may include a respective digital image 114 upon with the edited images 116 are based, as well as the edit data 120 that can be applied to the respective digital images 114 to generate corresponding edited images 116. For each edited image 116, for example, the edit data 120 includes an Extensible Metadata Platform (XMP) file that identifies how a particular digital image 114 was transformed via editing to generate the edited image 116.

The user data 118 generally represents data that describes associations between different users and the edited images 116. For instance, the user data 118 identifies individual users that generate respective instances of the edited images 116. In at least one implementation, the edited images 116 include image collections 122, which are representative of different sets of edited images 116 that are grouped based on different criteria. For instance, the image collections 122 include groups of edited images 116 that are generated by different users identified in the user data 118.

The application data 110 further includes tutorial data 124, which represents subject matter-based content that can be leveraged to provide learning experiences for different aspects of image editing. In at least some implementations, the tutorial data 124 may be linked to particular instances of the edited images 116, such as to utilize different edited images 116 as example ways for achieving different image editing goals.

Further to techniques for edit experience for transformation of digital content, the image editor application 108 includes an instructor module 126, a replay module 128, and a remix module 130 that each provide different aspects of the functionality and user experiences described herein. The instructor module 126, for instance, represents functionality for outputting user experiences that explain how a particular edited image 116 was generated via the image editor application 108. For example, the instructor module 126 can take a digital image 114 and edit data 120, and output a visual walk-through of how a particular edited image 116 was generated from the digital image 114. Further, the instructor module 126 can utilize the tutorial data 124 to output different tutorial experiences that explain ways in which different image editing operations can be achieved. According to various implementations, the user experience provided by the instructor module 126 is interactive and invites user input at various stages to provide a hands-on learning experience.

The replay module 128 represents functionality for providing a replay experience that demonstrates how a particular edited image 116 was generated from a respective digital image 114. For a particular edited image 116, for instance, the replay module 128 takes an original digital image 114 and corresponding edit data 120, and outputs a visualization of how the particular edited image 116 was generated. Generally, the replay experience is output by the replay module 128 as an automated manipulation of edit controls of the image editor application 108 and that demonstrates how edit data 120 was applied to generate a particular edited image 116. In at least some implementations, the replay experience is intended to be viewed and does not require user input to proceed once it begins. The replay experience, for example, represents a more passive viewer experience than is provided by the instructor module 126.

The remix module 130 represents functionality for enabling different users to contribute to editing digital images 114 and/or edited images 116. For instance, when a particular user views an edited image 116, the user may then interact, via the remix module 130, to further edit the edited image 116 and generate an additional instance of an edited image 116 based on the further edits. As further described below, the remix module 130 can provide a variety of different remix experiences, such as via social media interactions that invite other users to remix digital images, and that publish remixed digital images on different platforms.

To enable users to interact with the image editor application 108, the image editor application 108 includes an image editor graphical user interface ("GUI") 132 displayed on display device 134 of the client device 102. The image editor GUI 132 is representative of functionality to present various visual affordances and user experiences as part of interacting with the image editor application 108.

In at least some implementations, certain image editing actions and user experiences of the image editor application 108 can be performed in part or wholly by the image editing service 104. The image editing service 104, for example, represents a network-based service that can assist the client device 102 in performing various image editing actions via the image editor application 108. To enable the image editing service 104 to perform such actions, the image editing service 104 maintains a service manager module 136 and service data 138 stored on a system storage 140. Generally, the service manager module 136 is representative of functionality for performing actions as part of techniques for edit experience for transformation of digital content described herein. For instance, the various interactions and user experiences described herein can be implemented at the client device 102, the image editing service 104, and/or via interaction between the client device 102 and the image editing service 104 over the network 106.

Having considered an example environment, consider now a discussion of some example details of the techniques for edit experience for transformation of digital content in accordance with one or more implementations.

Figure 2:
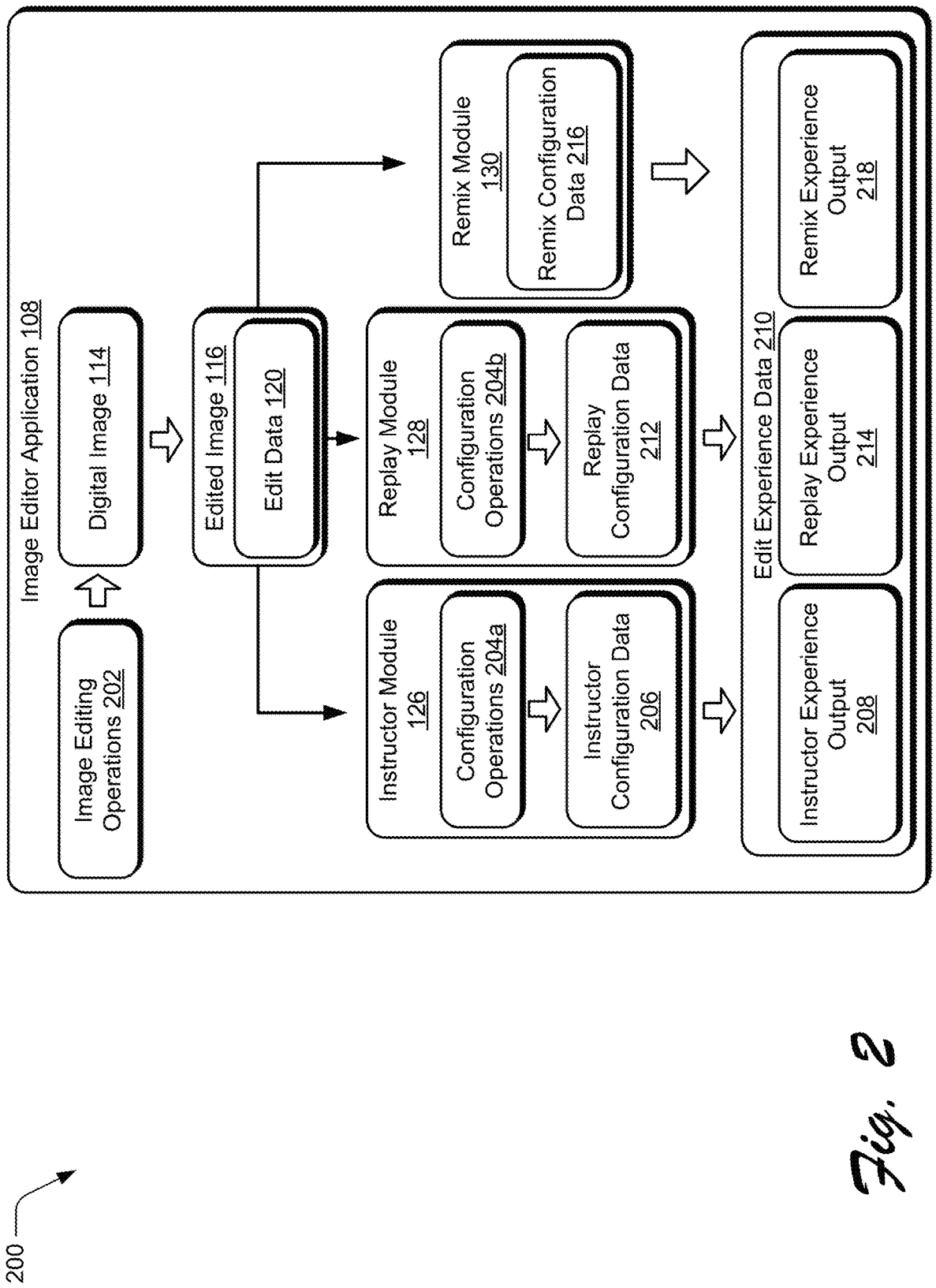
FIG. 2 depicts portions of an image editor system which enables different edit experiences to be generated utilizing techniques for edit experience for transformation of digital content described herein.

FIG. 2 depicts portions of an image editor system 200 in an example implementation in which the image editor application 108 enables different user experiences to be generated utilizing techniques for edit experience for transformation of digital content described herein. In the system 200, the image editor application 108 receives image editing operations 202 to a digital image 114 to generate an edited image 116. A user, for instance, interacts with the image editor application 108 to provide input that generates the image editing operations 202 to manipulate various attributes of the digital image 114 and generate the edited image 116. Further, the edited image 116 includes edit data 120 that describes how the digital image 114 was edited to generate the edited image 116. The edit data 120, for instance, includes a digital representation of the image editing operations 202.

To enable different user experiences to be generated based on the edited image 116, the edited image 116 along with the edit data 120 are input to the different modules of the image editor application 108. For instance, the instructor module 126 applies configuration operations 204a based on the edited image 116 to generate instructor configuration data 206. The instructor module 126 then outputs an instructor experience output 208 based on the instructor configuration data 206 to generate portions of edit experience data 210. In at least some implementations, the configuration operations 204a are based on user input to the image editor application 108 to configure different aspects of the instructor experience output 208, which is reflected in the instructor configuration data 206. Thus, the instructor module 126 can apply the instructor configuration data 206 to the edited image 116 to generate the instructor experience output 208. Generally, the instructor experience output 208 represents an interactive user experience that utilizes interactive and automated manipulation of the image editor application 108 to explain how the edited image 116 was generated from the digital image 114.

Further to the system 200, the replay module 128 applies configuration operations 204b based on the edited image 116 to generate replay configuration data 212. The replay module 128 then outputs replay experience output 214 based on the replay configuration data 212 and as part of the edit experience data 210. Generally, the replay experience output 214 represents a consumable user experience that utilizes, at least in part, media output to explain how the edited image 116 was generated from the digital image 114. In at least some implementations, the replay experience output 214 represents a more passive user experience than the instructor experience output 208.

Further to the system 200, the remix module 130 utilizes the edited image 116 to generate remix configuration data 216, which is utilized by the remix module 130 to generate remix experience output 218 as part of the edit experience data 210. Generally, the remix experience output 218 enables the edited image 116 to be shared and edited in different ways. As part of the remix experience output 218, for example, the remix module 130 can cause the edited image 116 to be published to the image editing service 104 where different users can view and interact with the edited image 116.

Thus, as depicted in the system 200, techniques for edit experience for transformation of digital content can be employed to provide different editing experiences that indicate how instances of digital content were edited as part of transforming the digital content.

Figure 3:
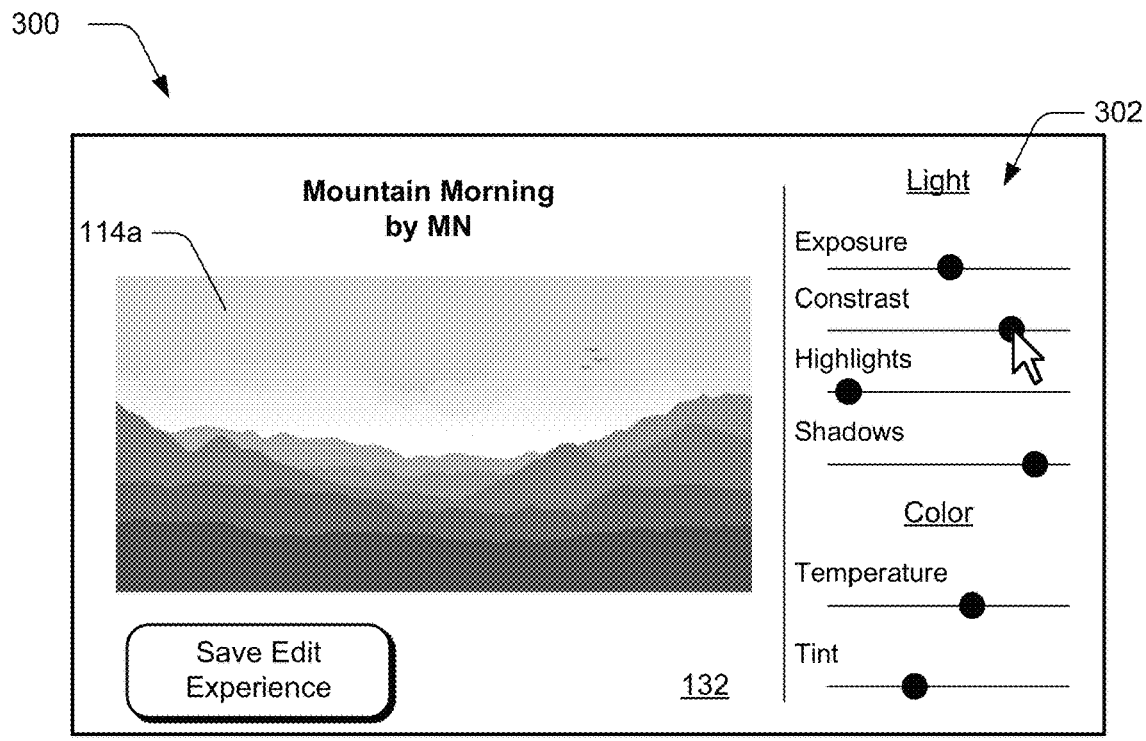
FIG. 3 depict aspects of an example scenario for generating an edit experience as part of transforming a digital image.
Figure 3:
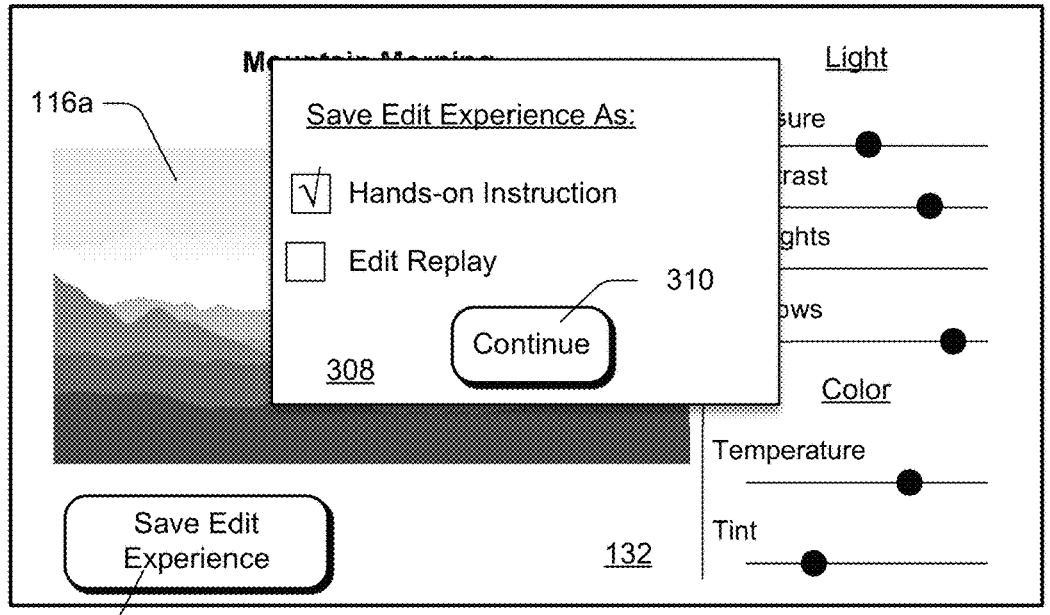

FIGS. 3-6 depict aspects of an example scenario for generating an edit experience as part of transforming a digital image. FIG. 3 depicts a scenario 300 for initiating an edit experience process. In the scenario 300, a digital image 114a is displayed in the image editor GUI 132. Further, the image editor GUI 132 includes edit controls 302 which are selectable to manipulate different visual attributes of the digital image 114a. In this particular example, the edit controls 302 include controls for editing different light and color attributes, but it is to be appreciated that techniques described herein can be applied to a wide variety of different attributes of digital content.

Further to the scenario 300, a user interacts with the edit controls 302 to generate image editing operations 304 that edit different attributes of the digital image 114a and generate an edited image 116a. Generally, the user interaction with the edit controls 302 is shown via the different slider controls and the user positioning of the slider thumbs in the slider controls to edit different attributes of the digital image 114a. In conjunction with (e.g., before, during, or after) editing the digital image 114a to generate the edited image 116a, the user selects an edit experience control 306 that is selectable to enable an edit experience to be generated based on the user's edits. Based on the user selection of the edit experience control 306, the image editor application 108 presents an edit experience menu 308 that enables the user to select which type of edit experience the user would like to generate, a "Hands-on Instruction" experience or an "Edit Replay" experience. In this example scenario, the user selects the "Hands-on Instruction" option and then selects a continue control 310 to proceed with generating the edit experience.

Figure 4:
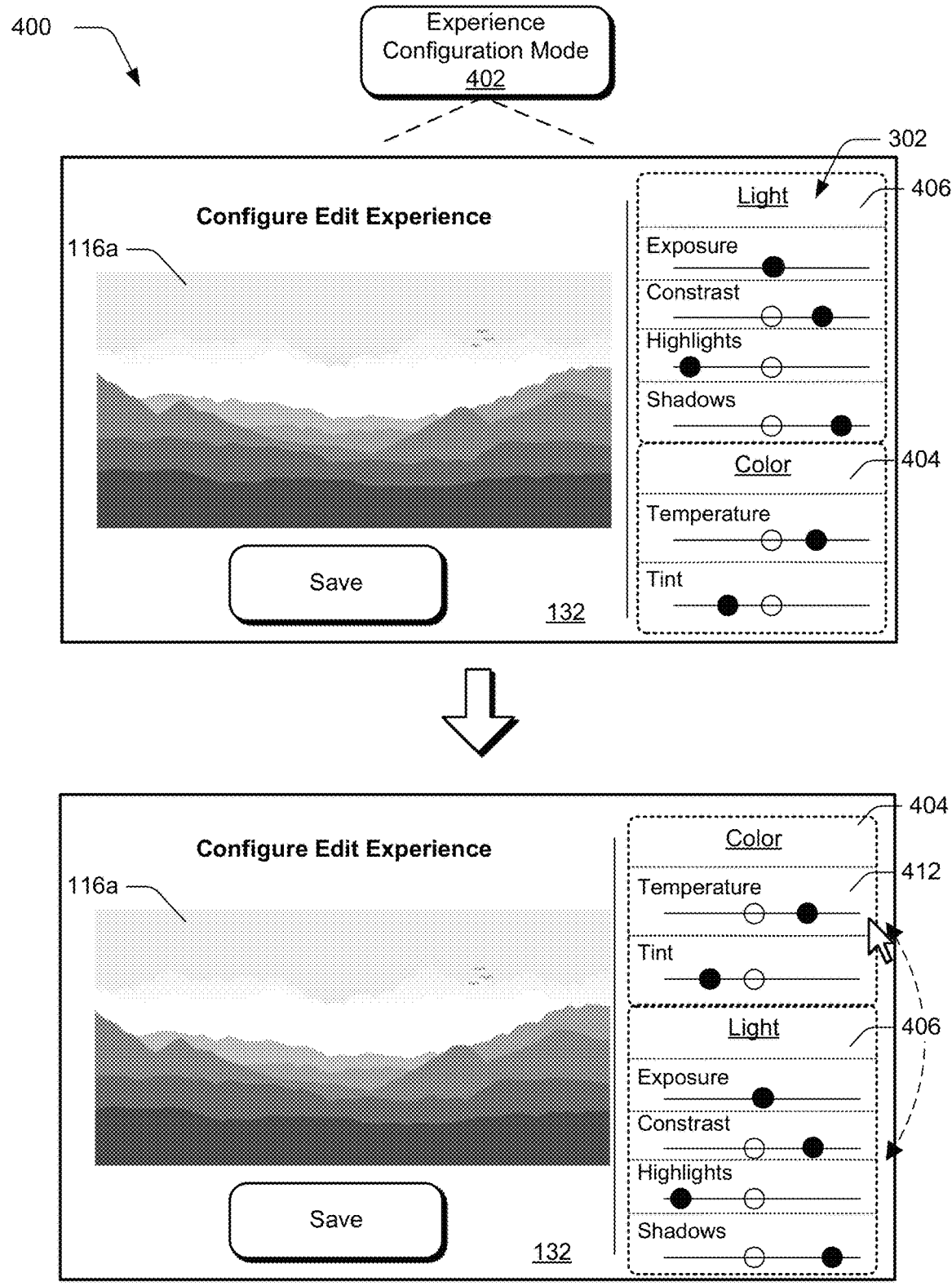
FIG. 4 depicts a scenario for configuring a graphical user interface (GUI) as part of an edit experience.

FIG. 4 depicts a scenario 400 for configuring a GUI as part of an edit experience. The scenario 400, for instance, represents a continuation of the scenario 300, discussed above. In the scenario 400, the image editor GUI 132 is in an experience configuration mode 402 that enables various aspects of a hands-on edit experience to be configured, such as via interaction with the image editor GUI 132 while in the experience configuration mode 402. The image editor application 108, for instance, transitions the image editor GUI 132 into the experience configuration mode 402 in response to selection of the continue control 310 of the edit experience menu 308, described above.

As part of enabling a hands-on edit experience to be generated while in the experience configuration mode 402, the instructor module 126 configures the image editor GUI 132 to enable the edit controls 302 to be reconfigured within the image editor GUI 132. As illustrated, the individual edit controls 302 include dashed outlines, which provides a visual indication that the individual edit controls 302 can be rearranged positionally relative to one another. Accordingly, the user selects a color menu 404 from the edit controls 302 and manipulates the color menu 404 to switch positions with a light menu 406. The user, for instance, provides input to drag the color menu 404 to a different position within the edit controls 302, which causes the color menu 404 to switch positions with the light menu 406.

In at least some implementations, the relative position of the individual edit controls 302 affects not only the visual appearance of the image editor GUI 132, but also affects how a corresponding edit experience is presented to a consuming user. For instance, edits applied to a digital image are presented based on an order in which the edit controls 302 are arranged in the image editor GUI 132, such as descending order from top to bottom of the edit controls 302. Alternatively or additionally, the edits are presented in an order in which they were applied as part of the original image editing process, such as discussed with reference to the scenario 300.

Notice that in the experience configuration mode 402, each edit control 302 includes a default indicator 408 and an edit indicator 410. Generally, the default indicator 408 identifies a position where no adjustment of a corresponding attribute would be applied to digital content. For instance, consider a temperature control 412 from the color menu 404. The default indicator 408 represents a position on the temperature control 412 where no change in image temperature would be applied from original temperature values of a corresponding image, e.g., the digital image 114a. The edit indicator 410 from the temperature control 412 represents a position to which the temperature control 412 is manipulated to change temperature values of the digital image 114a as part of generating the edited image 116a, such as described with reference to the scenario 300. Thus, in at least some implementations, the spatial relationship between the default indicator 408 and the edit indicator 410 provides an editing "before and after" explanation for each edit control 302.

Figure 5:
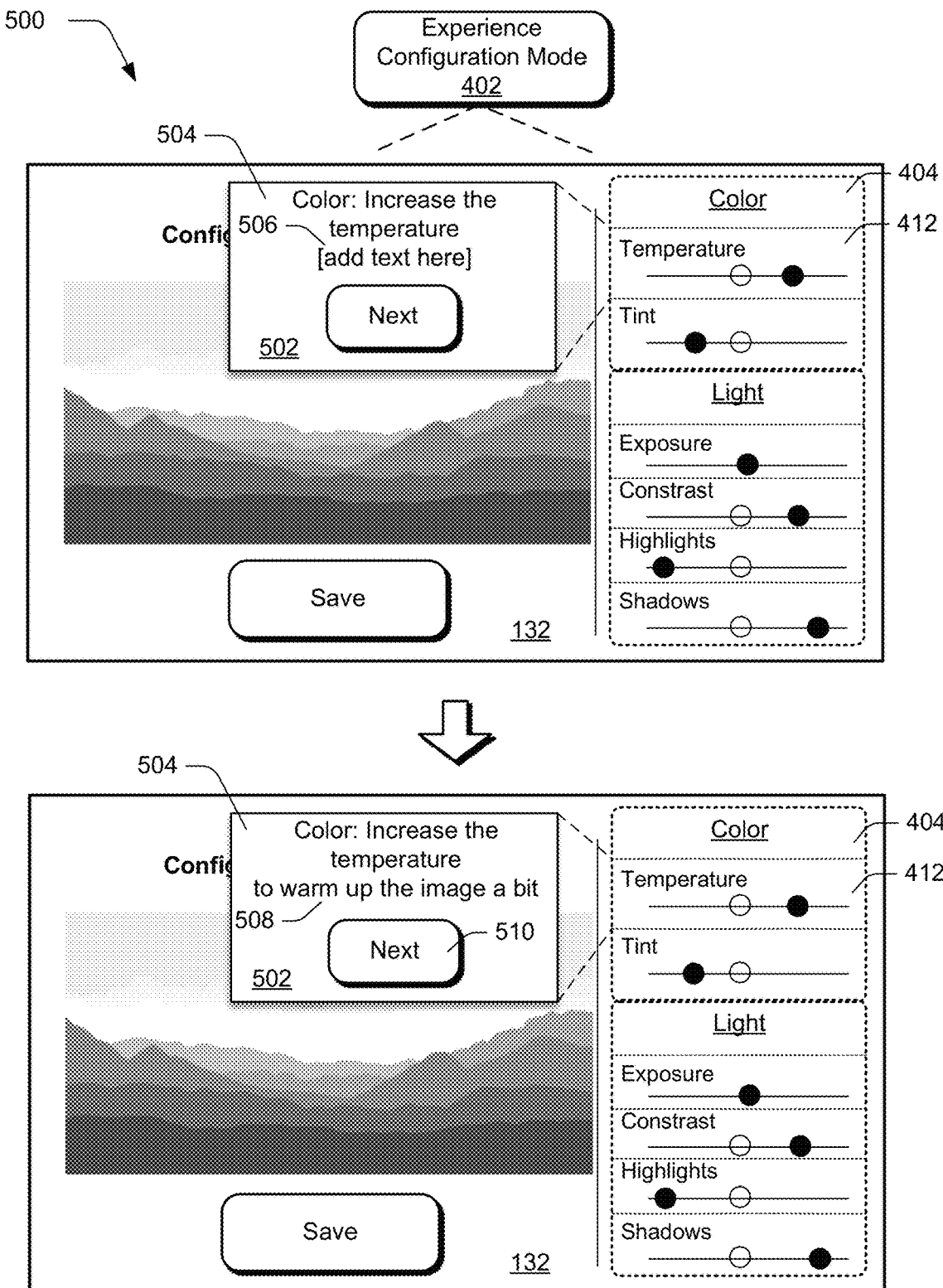
FIG. 5 depicts a scenario for configuring a GUI as part of an edit experience.

FIG. 5 depicts a scenario 500 for configuring a GUI as part of an edit experience. The scenario 500, for instance, represents a continuation of the scenarios 300, 400 discussed above. In the scenario 500, the image editor GUI 132 is in the experience configuration mode 402, and the user selects the temperature control 412 from the color menu 404. In response to selection of the temperature control 412, a control prompt 502 is presented that includes information describing how the temperature control 412 is adjustable as part of generating the edit experience. The control prompt 502, for instance, includes instructions for adjusting the temperature control 412 to match the edits applied to generate the edited image 116a.

In this particular example, the control prompt 502 includes default text 504 that is automatically populated to the control prompt 502 by the instructor module 126. The instructor module 126, for instance, maintains a collection of default text statements that can be correlated to corresponding actions that occur in manipulating the edit controls 302. For example, the instructor module 126 detects relative adjustment of the individual edit controls 302, and can match a default text statement that correlates to the adjustment. Generally, each default text statement is topically correlated to a particular edit control 302. For instance, the default text 504 is topically relevant to the temperature control 412 and identifies a relative adjustment of the temperature control 412, i.e., "Increase the temperature."

The control prompt 502 further includes a Tillable text field 506 that is able to receive user input of text (and/or other content) to append or replace the default text 504. Accordingly, proceeding with the scenario 500, the user inputs custom text content 508 into the text field 506 providing further explanation of the adjustment of the temperature control 412. The user then selects a next button 510 from the control prompt 502, which causes the configuration mode 402 to proceed.

Figure 6:
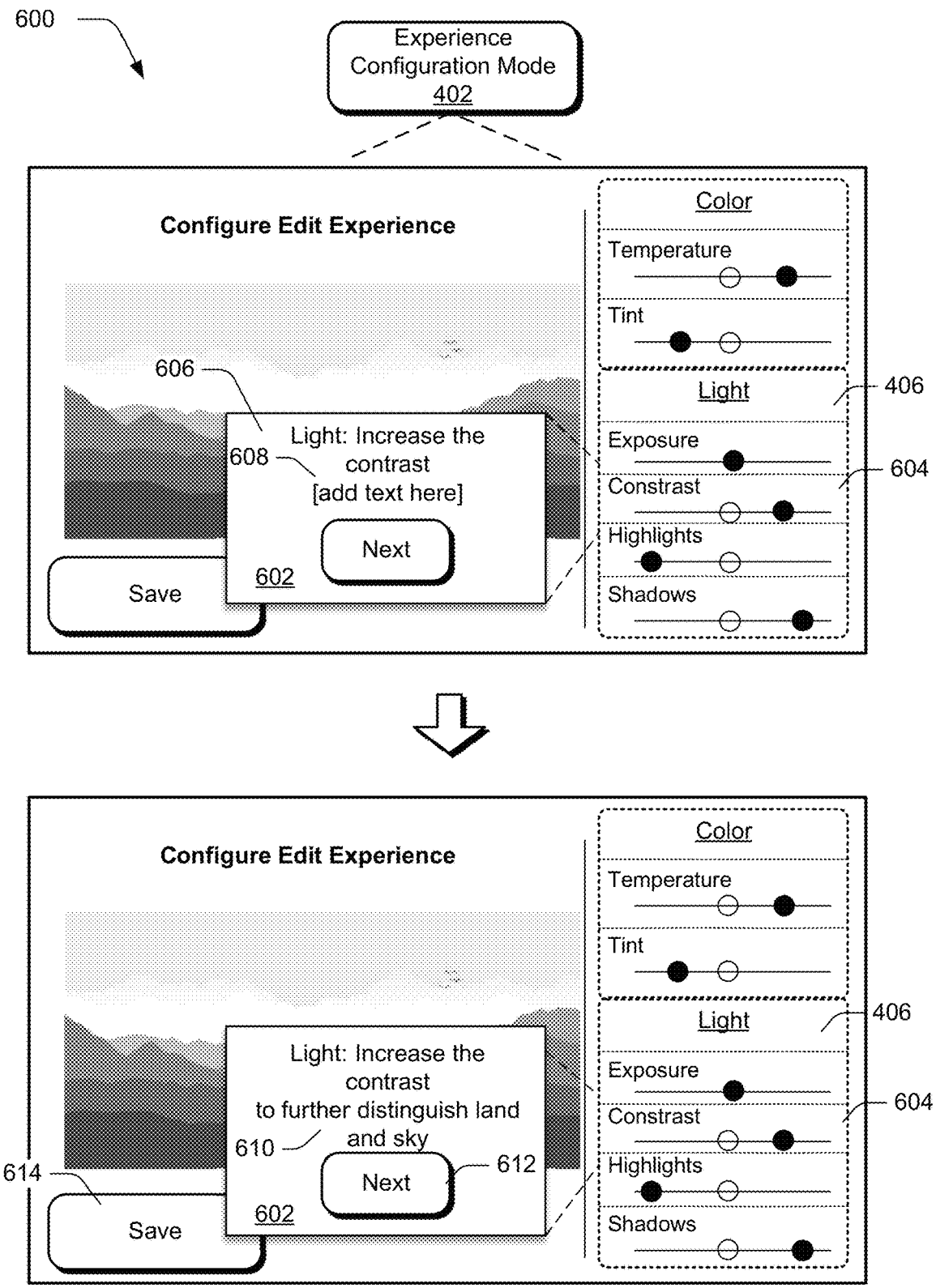
FIG. 6 depicts a scenario for configuring a GUI as part of an edit experience.

FIG. 6 depicts a scenario 600 for configuring a GUI as part of an edit experience. The scenario 600, for instance, represents a continuation of the scenarios 300-500 discussed above. In the scenario 600, a control prompt 602 is presented adjacent a contrast control 604 of the light menu 406. The control prompt 602, for instance, is presented automatically in response to selection of the next button 510 from the control prompt 502. As another implementation, the control prompt 602 is presented in response to user selection of the contrast control 604.

The control prompt 602 includes default text 606 and a fillable text field 608. Accordingly, the user inputs custom text 610 into the fillable text field 608 and selects a next button 612, which causes the edit experience configuration to proceed according to the experience configuration mode 402. Generally, the described process occurs for the applicable edit controls 302 to enable control prompts and/or other instructive affordances to be configured for the edit controls 302 to generate the edit experience data 210 that is executable to enable a user to interact and recreate the edits used to generate the edited image 116a. This configuration of the edit experience, for example, is performed via the configuration operations 204a to generate the instructor configuration data 206, which is used to then generate the instructor experience output 208, described previously with reference to the system 200. Alternatively or in addition, configuration of the edit experience is performed via the configuration operations 204b to generate the replay configuration data 212, which is used to then generate the replay experience output 214. Further to the scenario 600, the user selects a save control 614, which causes the various interactions and configurations described above to be saved as part of the edit experience data 210. Thus, the edit experience data 210 is executable to output different edit experiences described herein.

Figure 7:
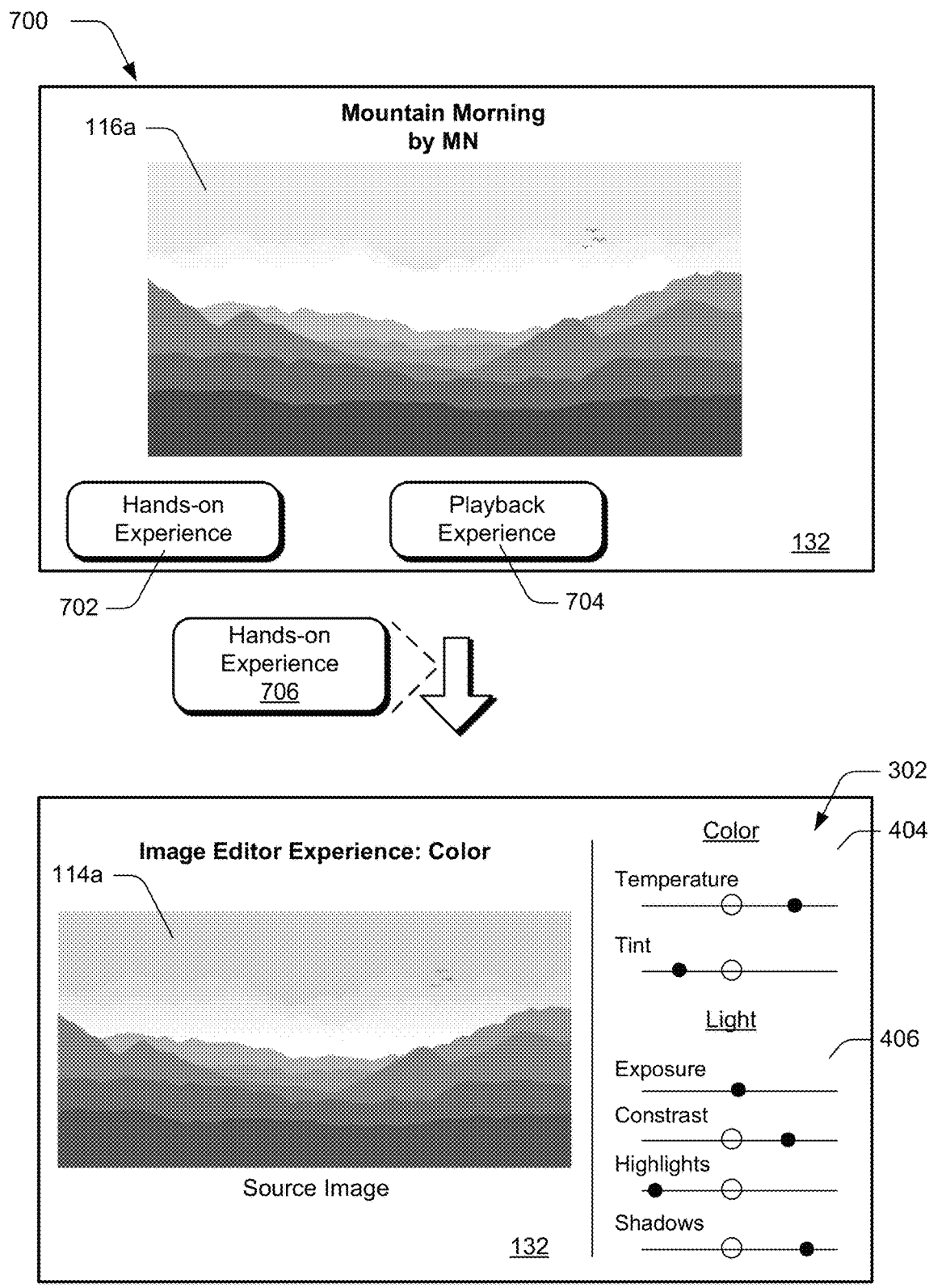
FIG. 7 depicts a scenario for initiating output of an edit experience.

FIGS. 7-10 depict a scenario for outputting an edit experience, such as the edit experiences generated in the scenarios 300-600. Accordingly, FIG. 7 depicts a scenario 700 for initiating output of an edit experience. The scenario 700 includes the image editor GUI 132 displaying the edited image 116a. The edited image 116a may be presented in various ways, such as in response to a user selection of the edited image 116a from an image collection 122. For instance, the user may browse the image collections 122, locate the edited image 116a, and select the edited image 116a for presentation. In another implementation, the edited image 116a is presented in response to user selection of a particular tutorial identified in the tutorial data 124. The particular tutorial, for example, pertains to subject matter related to different topics in content editing, and thus the edited image 116a is selected by the image editor application 108 as an example of the subject matter.

The image editor GUI 132 further includes a hands-on button 702 and a playback button 704 that are respectively selectable to initiate a hands-on edit experience or a playback edit experience. In this particular example, a user selects the hands-on button 702, which causes a hands-on experience 706 to begin. The user, for instance, wishes to participate in the hands-on experience 706 to learn how the edited image 116a was created. In at least one implementation, the hands-on experience 706 includes the instructor experience output 208 configured via the instructor configuration data 206.

As part of initiating the hands-on experience 706, the digital image 114a upon which the edited image 116a is based is displayed in the image editor GUI 132. Further, the edit controls 302 are presented adjacent the digital image 114a. In this particular example, the edit controls 302 include the color menu 404 and the light menu 406, as configured as part of the experience configuration mode 402. Further, the default indicators 408 are positioned in default positions in the respective edit controls 302, which reflects current setting values for the digital image 114a. Each of the edit controls 302 also includes an edit indicator 702, which represents a position to which each default indicator 408 is movable to adjust each edit control 302 to a setting corresponding to the edited image 116a.

Figure 8:
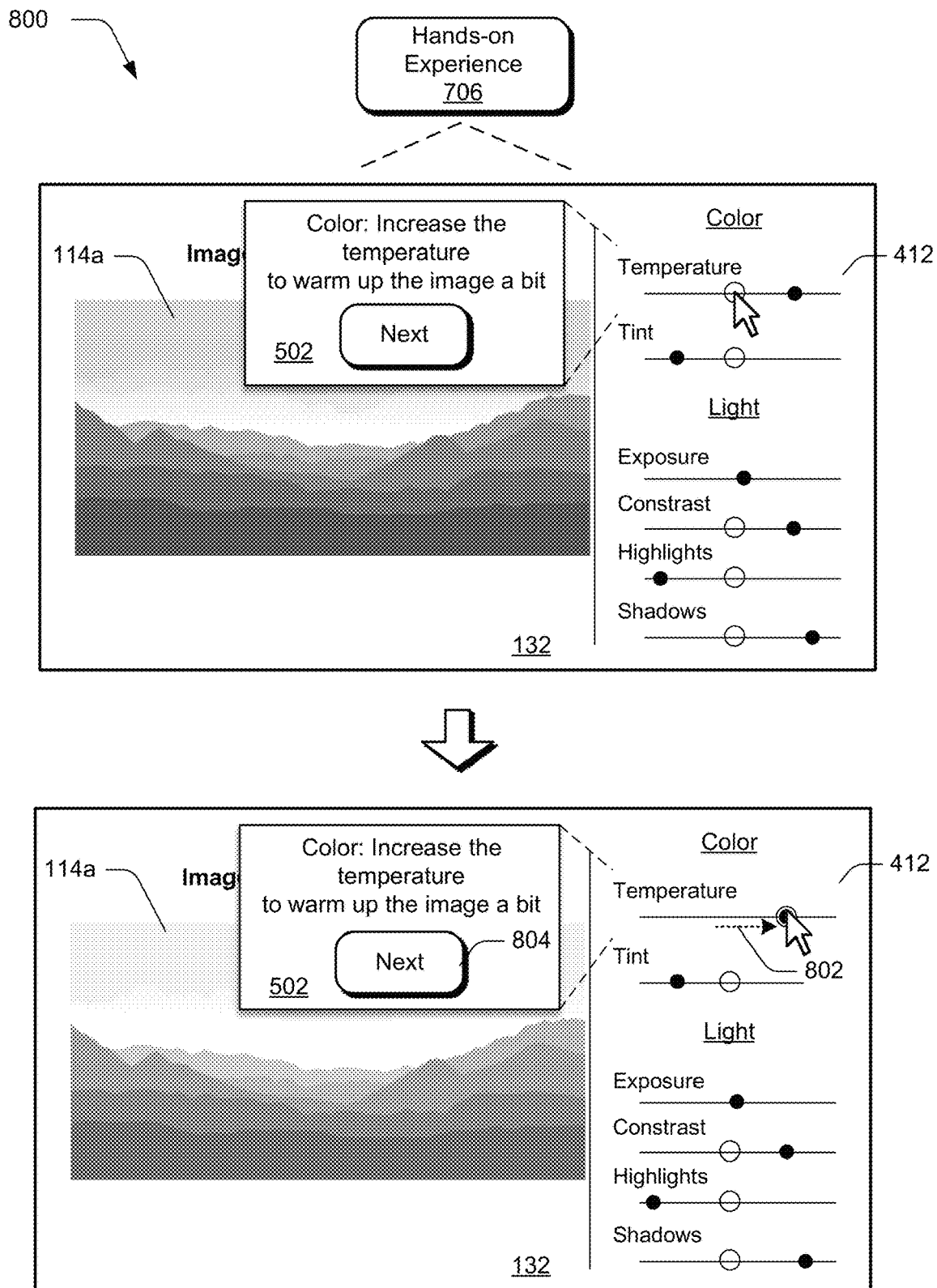
FIG. 8 depicts a scenario for outputting portions of an edit experience.

FIG. 8 depicts a scenario 800 for outputting portions of an edit experience. The scenario 800, for instance, represents a continuation of the scenario 700 and represents further portions of the hands-on experience 706. In the scenario 800, the control prompt 502 is output adjacent the temperature control 412, and includes the content as configured during the experience configuration process previously described. The control prompt 502 generally instructs the user to adjust the temperature control 412, such as by manipulating the default indicator 408 to match the edit indicator 702.

Accordingly, a user applies a manipulation gesture 802 to the temperature control 412 to move the default indicator 408 to correspond positionally to the edit indicator 702. The manipulation gesture 802 can be applied in various ways, such as by dragging the default indicator 408 using a mouse and cursor, a touch gesture, voice input, and so forth. By manipulating the temperature control 412 to the edit indicator 702, the temperature values of the digital image 114a are adjusted to correspond to those of the edited image 116a.

Generally, after the temperature control 412 is manipulated as described, the hands-on experience 706 proceeds. For instance, a user selects a next control 804 from the control prompt 502, which causes the hands-on experience 706 to continue. Alternatively or in addition, the image editor application 108 detects that the temperature control 412 is manipulated to match the edit indicator 702, and in response automatically causes the hands-on experience 706 to proceed.

Figure 9:
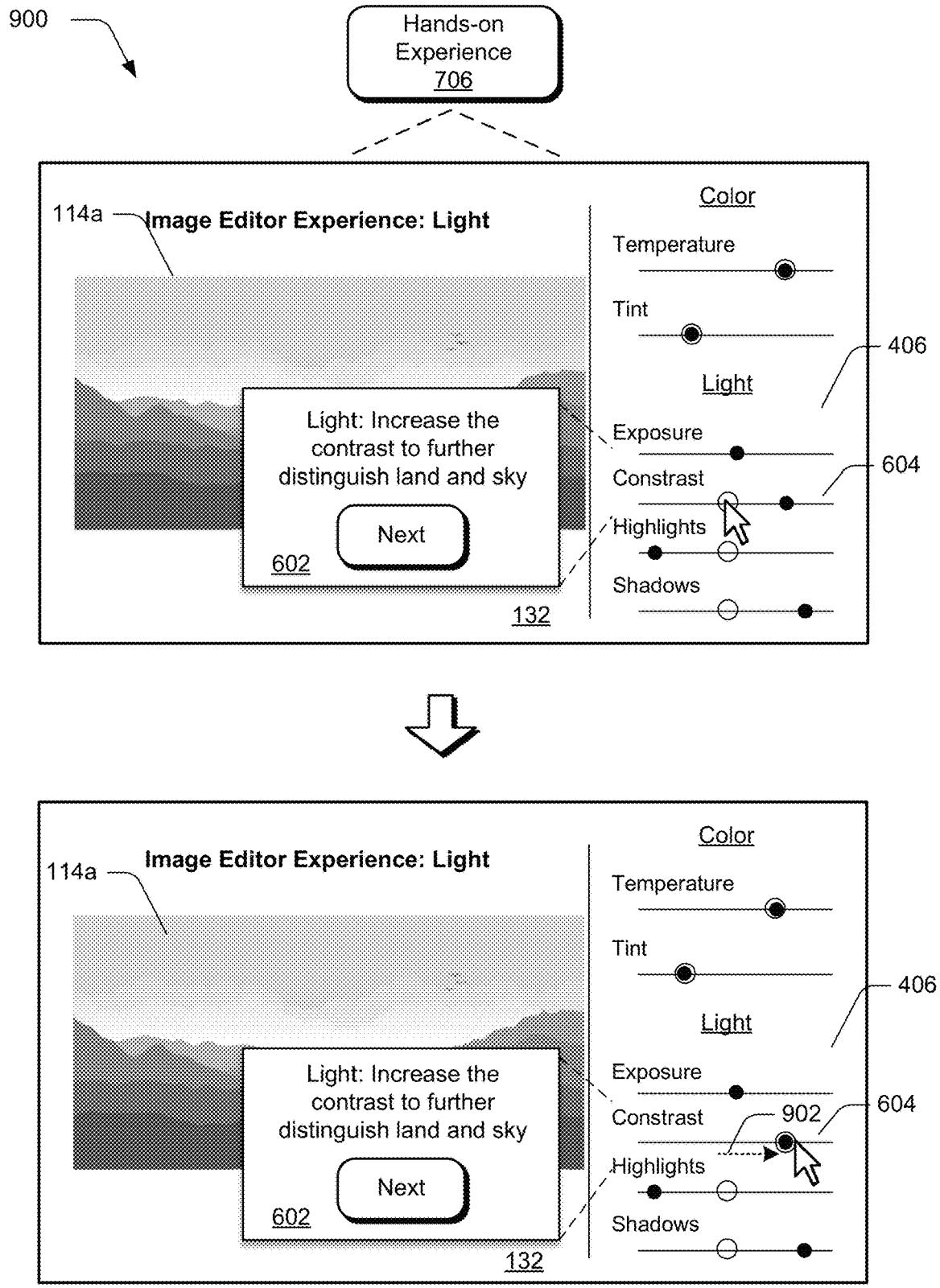
FIG. 9 depicts a scenario for outputting portions of an edit experience.

FIG. 9 depicts a scenario 900 for outputting portions of an edit experience. The scenario 900, for instance, represents a continuation of the scenarios 700, 800 and represents further portions of the hands-on experience 706. In the scenario 900, the hands-on experience 706 proceeds from editing color attributes of the digital image 114a to editing light attributes of the digital image 114a. For instance, the hands-on experience 706 proceeds sequentially through the different edit controls 302, such as in visual hierarchical order from top to bottom. Alternatively, during the experience configuration mode 402, the user can specify a custom order for the hands-on experience 706 which may be different than a visually hierarchical order.

As part of demonstrating editing of the light attributes, the control prompt 602 is output adjacent the contrast control 604 from the light menu 406. The control prompt 602 generally instructs the user to adjust the contrast control 604, such as by manipulating the default indicator 408 to match the edit indicator 702 in the contrast control 604.

Accordingly, a user applies a manipulation gesture 902 to the contrast control 604 to move the default indicator 408 to positionally correspond to the edit indicator 702. By manipulating the contrast control 604 to the edit indicator 702, the contrast values of the digital image 114a are adjusted to correspond to those of the edited image 116a.

Figure 10:
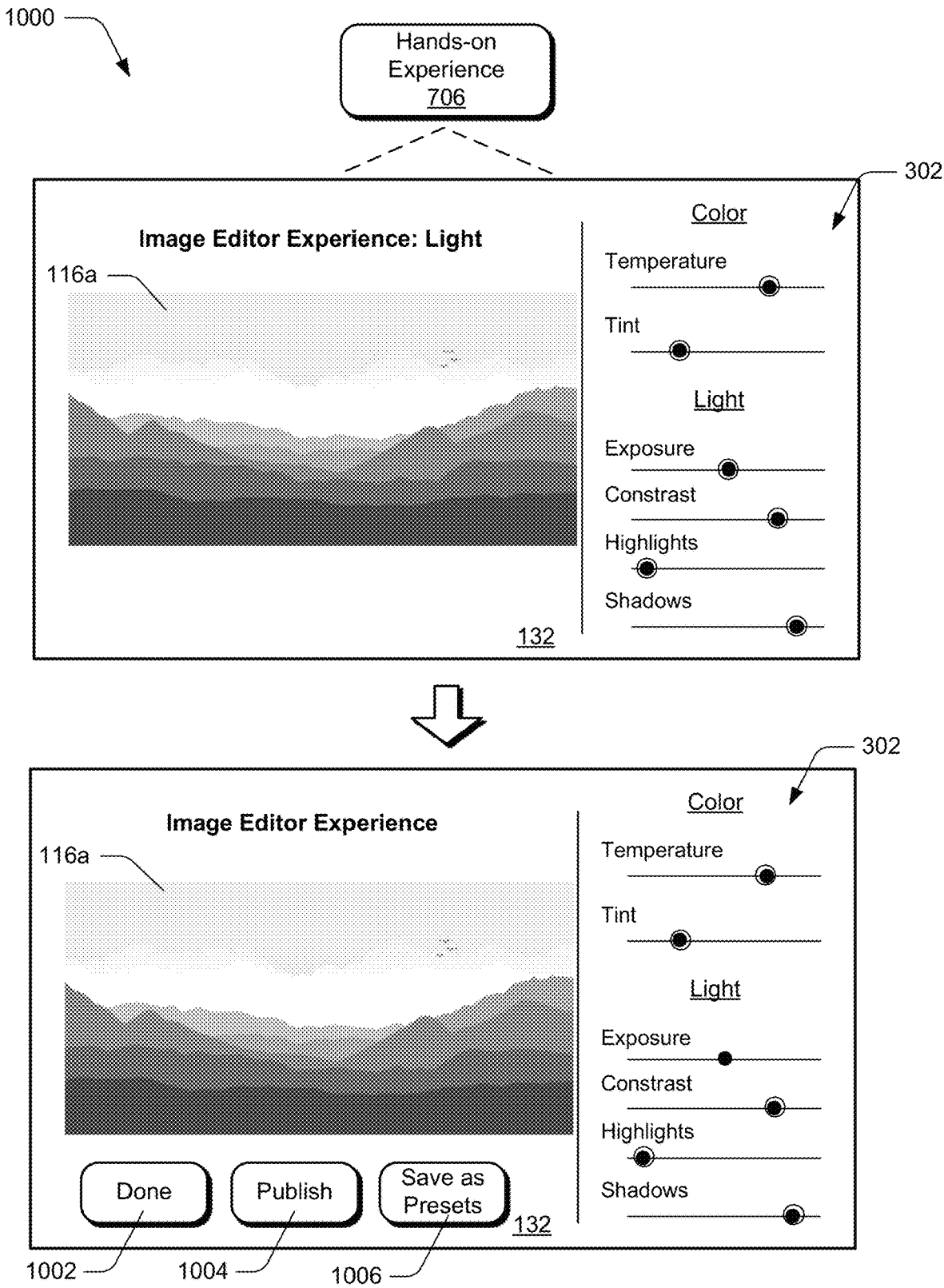
FIG. 10 depicts a scenario for outputting portions of an edit experience.

FIG. 10 depicts a scenario 1000 for outputting portions of an edit experience. The scenario 1000, for instance, represents a continuation of the scenarios 700-900 and represents further portions of the hands-on experience 706. In the scenario 1000, the hands-on experience 706 proceeds to prompt the user to adjust others of the edit controls 302 until the edited image 116a is replicated from the digital image 114a. For instance, notice that the various default indicators 408 are manipulated to positionally coincide with the respective edit indicators 702 in the different edit controls 302.

The image editor GUI 132 presents a number of selectable options for performing different actions based on the hands-on experience 706. For instance, a done control 1002 is presented that is selectable to finish the hands-on experience 706. Selecting the done control 1002, for example, enables a user to save the edited image 116a generated as part of the hands-on experience 706.

Further, a publish control 1004 is presented that is selectable to enable a user to publish the edited image 116a, such as to the image editing service 104. Publishing the edited image 116a, for example, enables the user to share the edited image 116a with other users, such as part of a collaborative image editing experience. A presets control 1006 is presented that is selectable to save the different settings of the edit controls 302 as a set of editing presets that can be applied to different digital images 114. For instance, selecting the presets control 1006 enables the settings represented by the adjusted edit controls 302 to be saved as a collection of edit settings that can be applied (e.g., as a group via a single input) to other digital images 114, such as to duplicate the edits applied to the digital image 114a to generate the edited image 116a.

While the scenarios 700-1000 are discussed in the context of a hands-on editing experience, the scenarios may also be utilized to illustrate implementation of a playback editing experience. For example, consider that in the scenario 700, the user selects the playback button 704, which causes a playback editing experience to be initiated. Accordingly, the playback editing experience may proceed automatically through the scenarios 700-1000, e.g., without requiring further user input to proceed through the scenarios. For example, the replay module 128 may perform the manipulation of the various edit controls 302 automatically, such as part of a step-by-step automated manipulation of the edit controls 302 that demonstrates how the edited image 116a is generated starting with the digital image 114a.

Figure 11:
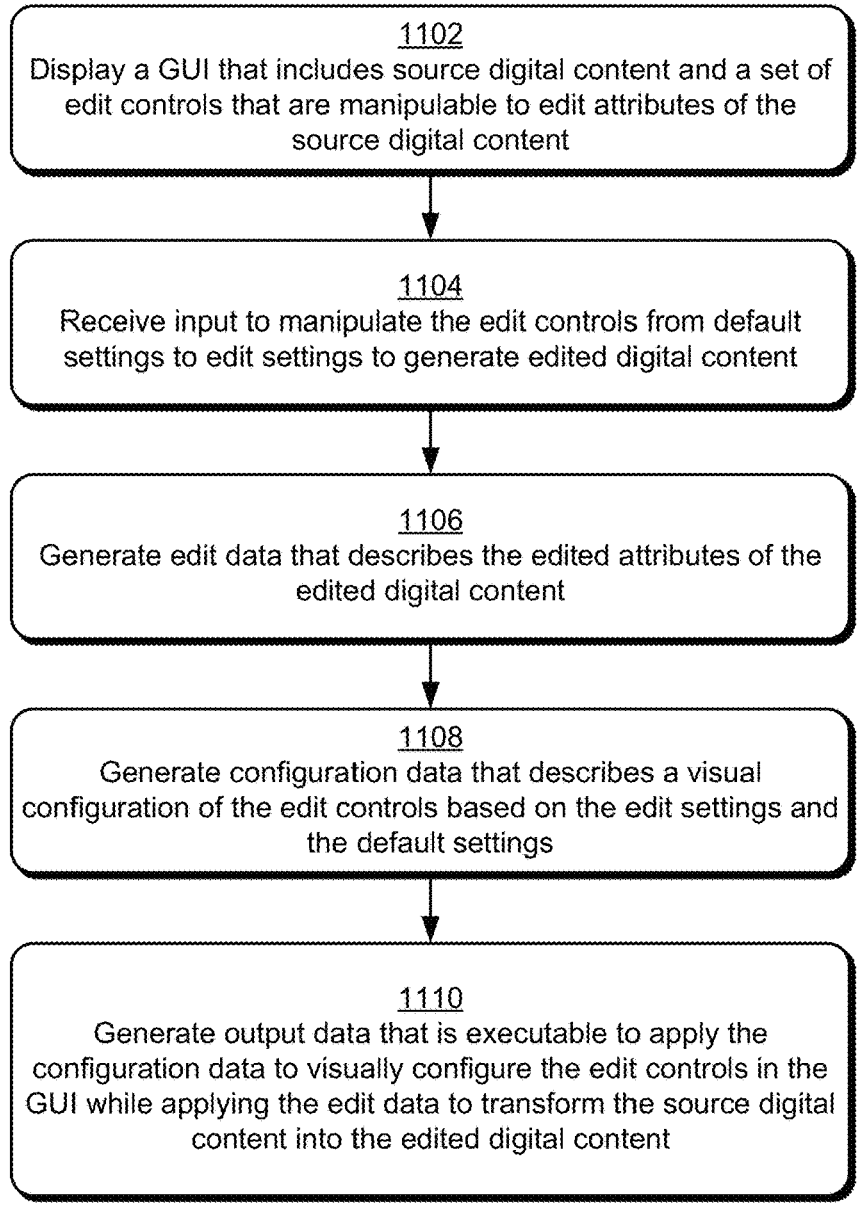
FIG. 11 depicts an example procedure for generating an edit experience.

FIG. 11 depicts an example procedure 1100 for generating an edit experience. A graphical user interface (GUI) is displayed that includes source digital content and a set of edit controls that are manipulable to edit attributes of the source digital content (block 1102). The image editor application, for example, causes the image editor GUI 132 to be displayed including an instance of a digital image 114, and various edit controls that are manipulable to edit various visual attributes of the digital image 114.

Input is received to manipulate the edit controls from default settings to edit settings to generate edited digital content (block 1104). The image editor application 108, for example, receives user input to manipulate the edit controls 302, which causes attributes of the source digital content to be edited to generate edited digital content. Edit data is generated that describes edited attributes of the edited digital content (block 1106). For instance, the image editor application 108 generates edit data 120 that identifies how visual attributes of the source digital content were edited to generate the edited digital content.

Configuration data is generated that describes a visual configuration of the edit controls based on the edit settings and the default settings (block 1108). The instructor module 126 and/or the replay module 128, for instance, generates configuration data that describes a visual configuration of the edit controls, such as a position of the edit controls 302 after the controls are manipulated to generated the edited digital content. The configuration data may also indicate a default position of the edit controls 302, such as a position of the edit controls prior to editing of the source digital content.

Output data is generated that is executable to apply the configuration data to visually configure the edit controls in the GUI while applying the edit data to transform the source digital content into the edited digital content (block 1110). For example, the instructor module 126 and/or the replay module 128 generates output data that is presentable as part of a subsequent interaction with the source digital content to provide the various edit experiences described herein, such as the instructor experience output 208 and/or the replay experience output 214.

Figure 12:
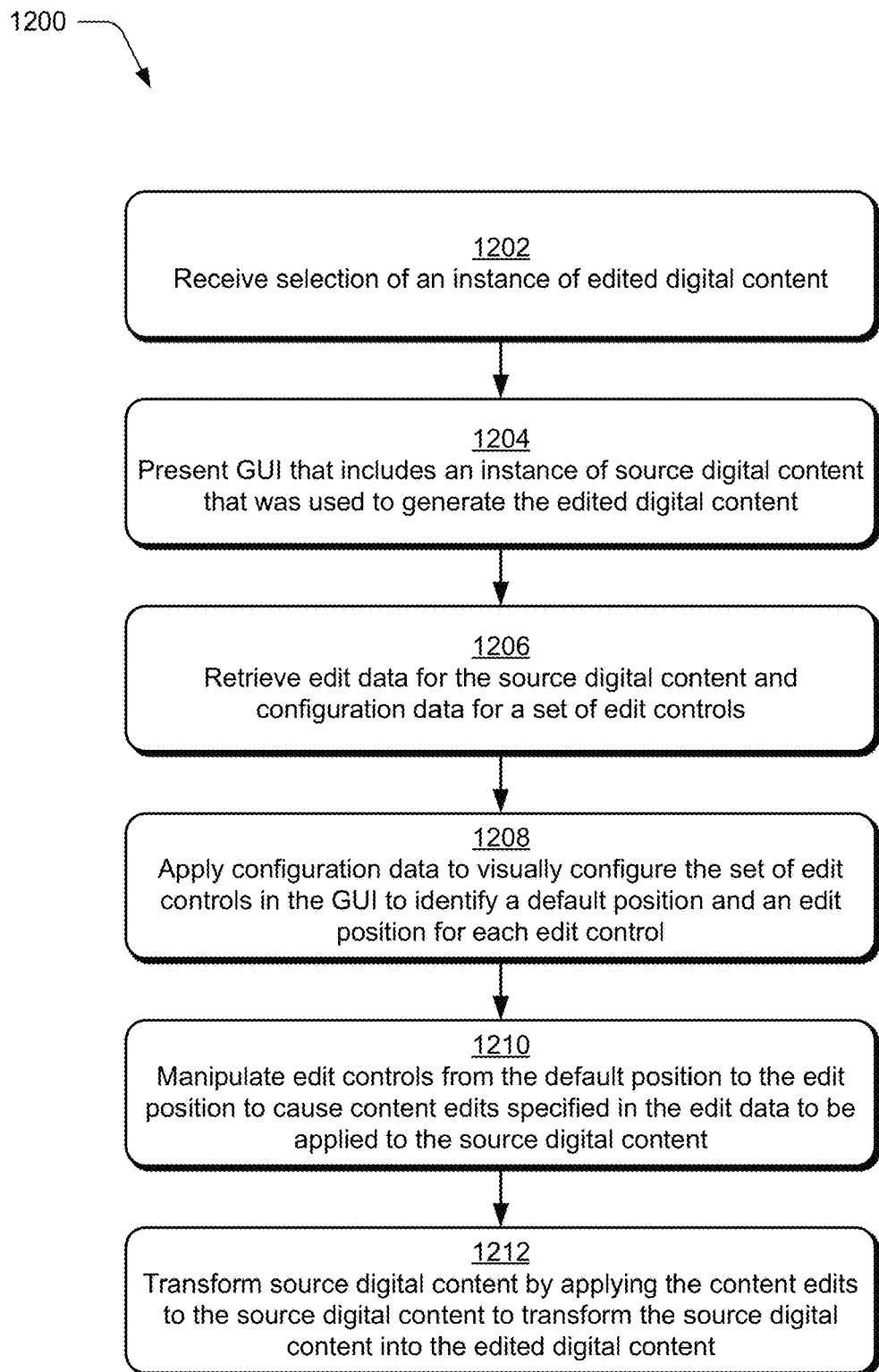
FIG. 12 depicts an example procedure for outputting an edit experience.

FIG. 12 depicts an example procedure 1200 for outputting an edit experience. A selection of an instance of edited digital content is received (block 1202). A user, for instance, interacts with the image editor application 108 to select an instance of an edited image 116. In at least one implementation, the user views a particular edited image, and wishes to know how the edited image was created. Accordingly, the user selects the edited image to initiate an edit experience. In at least one implementation, the user initiates the edit experience by selecting one of the hands-on button 702 or the playback button 704 from the image editor GUI 132.

A graphical user interface (GUI) is presented that includes an instance of source digital content that was used to generate the edited digital content (block 1204). For example, the instructor module 126 and/or the replay module 128 retrieves a digital image 114 that was edited to generate the edited digital content, and displays the digital image in the image editor GUI 132. Edit data for the source digital content and configuration data for a set of edit controls is retrieved (block 1206). Generally, the edit data describes edits that were applied to the source digital content to generate the edited digital content. Further, the configuration data describes manipulation of the set of edit controls as part of applying the edits to the source digital content.

The configuration data is applied to visually configure the set of edit controls in the GUI to identify a default position and an edit position for each edit control (block 1208). Each edit position, for instance, indicates a position to which each edit control was previously manipulated to edit the source digital content and generate the edited digital content.

Each edit control of the set of edit controls is caused to be manipulated from the default position to the edit position to cause content edits specified in the edit data to be applied to the source digital content (block 1210). How each edit control is manipulated is generally based on which particular edit experience is being applied. For instance, in a hands-on edit experience, the edit controls are manipulated in response to user input specifying manipulation of the edit controls. In a playback edit experience, the edit controls may be automatically manipulated, such as via an automated manipulation by the replay module 128.

The source digital content is transformed by applying the content edits to the source digital content to transform the source digital content into the edited digital content (block 1212). The image editor application 108, for example, renders the edited content 116a by applying edits identified in the edit data 120 to the source digital image 114a, and displays the edited content 116a in the image editor GUI 132.

Figure 13:
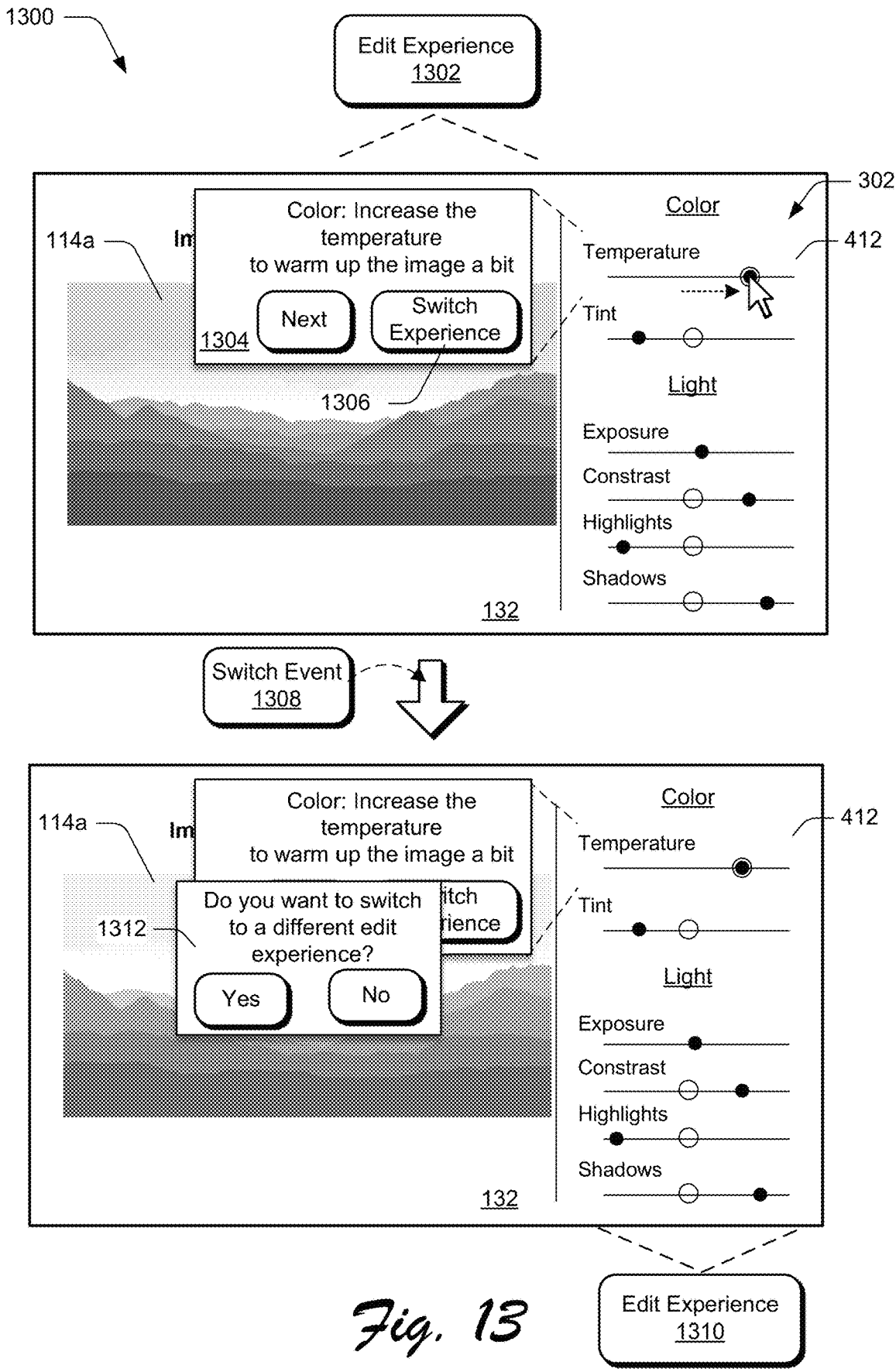
FIG. 13 depicts a scenario for transitioning between different edit experiences.

FIG. 13 depicts a scenario 1300 for transitioning between different edit experiences. The scenario 1300, for example, represents a variation on the scenarios 700-1000, discussed above, and may be implemented in conjunction with the described scenarios. In the scenario 1300, an edit experience 1302 for editing the digital image 114a is being output by the image editor application 108 via the image editor GUI 132. The edit experience 1302, for example, represents one of a hands-on edit experience or a replay edit experience. As part of the edit experience 1302, a control prompt 1304 is output adjacent the temperature control 412. The control prompt 1304 includes content regarding the edit experience 1302, such as a prompt for the user to perform an action in relation to the edit experience 1302. The control prompt 1304 also includes a switch control 1306 that is selectable to transition between different edit experiences.

During the edit experience 1302, a switch event 1308 occurs indicating that a switch between edit experience types is to occur. The switch event 1308 represents an action (e.g., a user-initiated action) that is interpreted by the image editor application 108 as a request (express or implied) to switch to a different edit experience. Generally, different actions may occur that cause the switch event 1308. One example action is user selection of the switch control 1308. Another example action is a user manipulation of an edit control 302. For instance, consider an example where the edit experience 1302 is a playback edit experience that proceeds, at least in part, independent of user input. During the playback edit experience 1302, a user interacts with the image editor GUI 132 to manipulate the temperature control 412. Accordingly, the image editor application 108 interprets the user manipulation of the temperature control 412 as an implied request to transition from the playback edit experience to a hands-on edit experience.

Based on the switch event 1308, the image editor application 108 transitions from the edit experience 1302 to an edit experience 1310. The edit experience 1302, for instance, represents a playback edit experience, and the edit experience 1310 represents a hands-on edit experience.

In at least one implementation, prior to switching to the edit experience 1310, the image editor application 108 presents a switch prompt 1312 to confirm whether the user wishes to switch to a different edit experience. Accordingly, the user can provide input to the switch prompt 1312 to confirm or decline a switch to a different edit experience.

Figure 14:
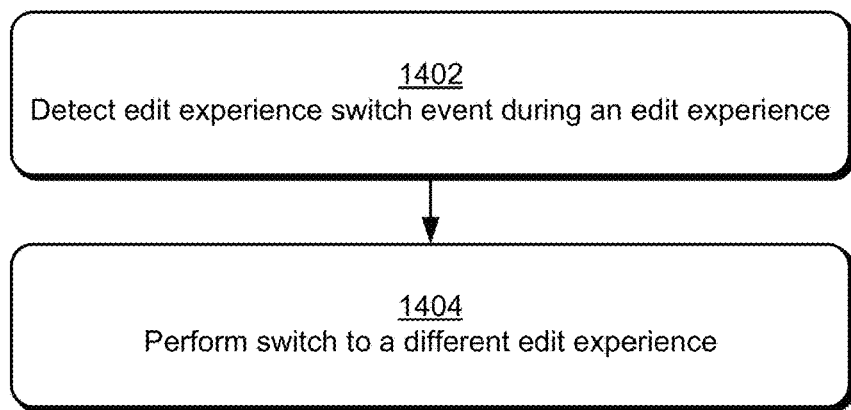
FIG. 14 depicts an example procedure for switching between edit experiences.

FIG. 14 depicts an example procedure 1400 for switching between edit experiences. An edit experience switch event is detected during an edit experience (block 1402). A user, for instance, interacts with the image editor application 108 while a particular edit experience is active to perform an action that is interpreted by the image editor application 108 as a trigger to switch to a different edit experience. As discussed above, the action may be an express request to switch edit experiences (e.g., via interaction with the switch prompt 1312), or an implied request based on user interaction with the edit controls 302.

A switch to a different edit experience is performed (block 1404). The image editor application 108, for example, switches to a different edit experience. Generally, the switch between edit experiences can occur dynamically while an edit experience is active. In at least one implementation, the image editor application 108 can prompt a user to confirm or decline the switch between edit experiences. For instance, if the user declines the switch, the image editor application 108 can cause the original edit experience to continue without switching between edit experiences.

Figure 15:
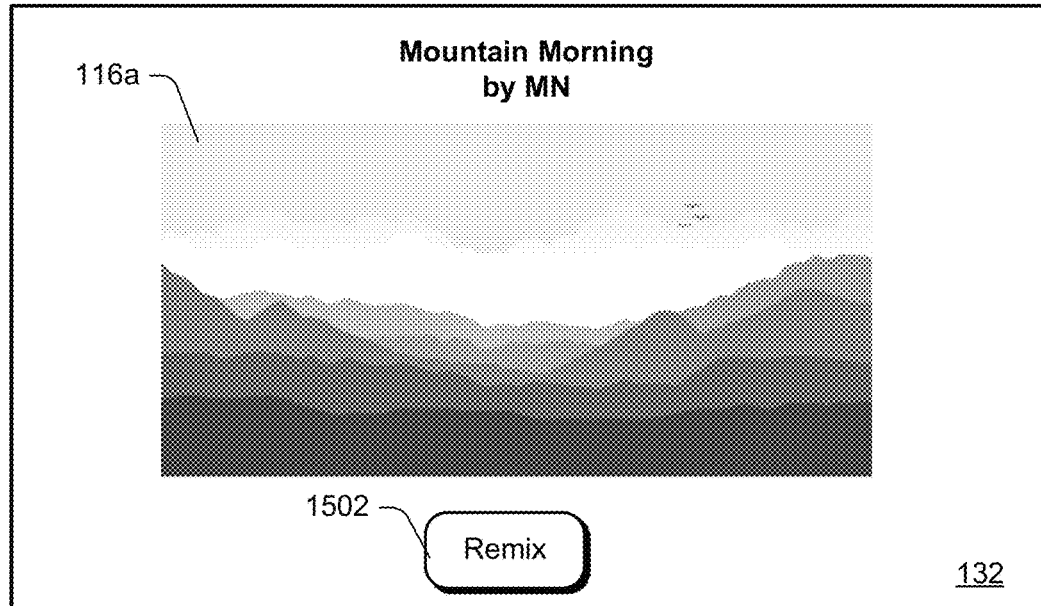
FIG. 15 depicts a scenario for a remix experience.
Figure 15:
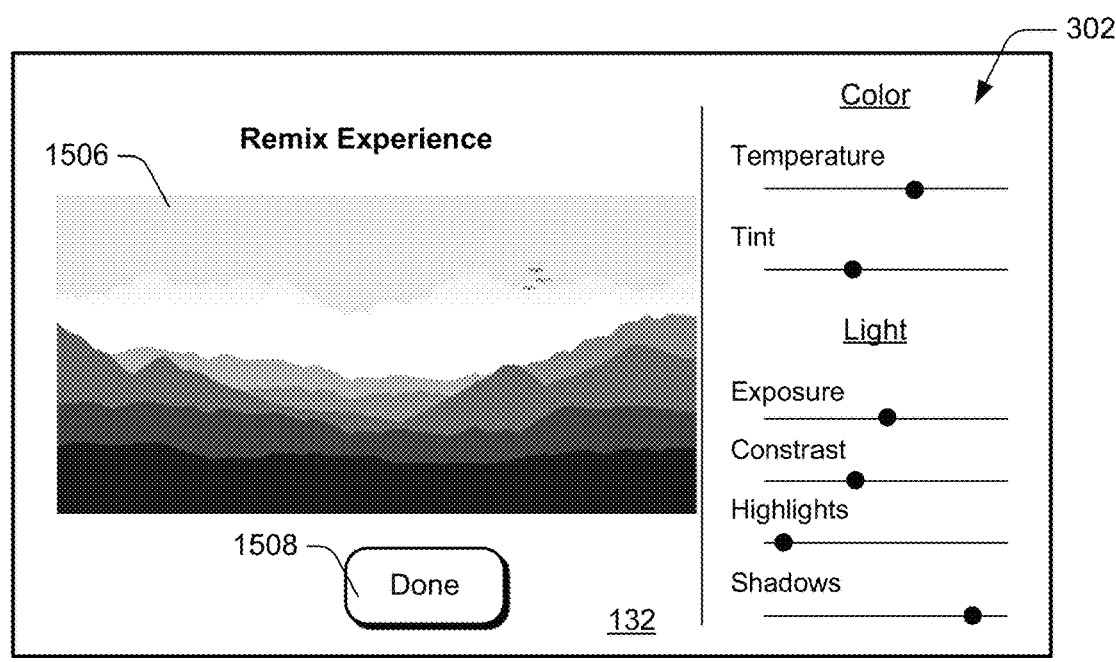
Figure 16:
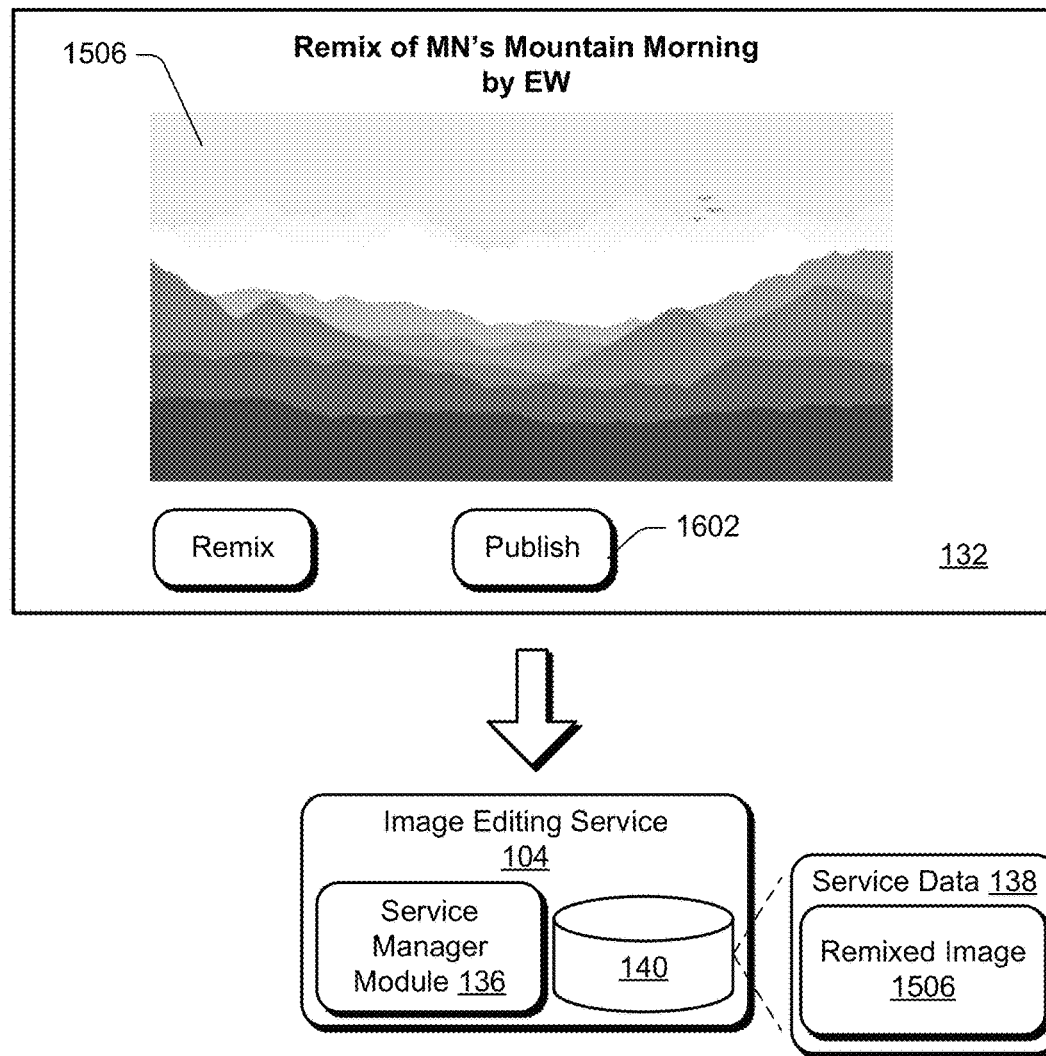
FIG. 16 depicts a scenario for publishing a remixed image.
Figure 17:
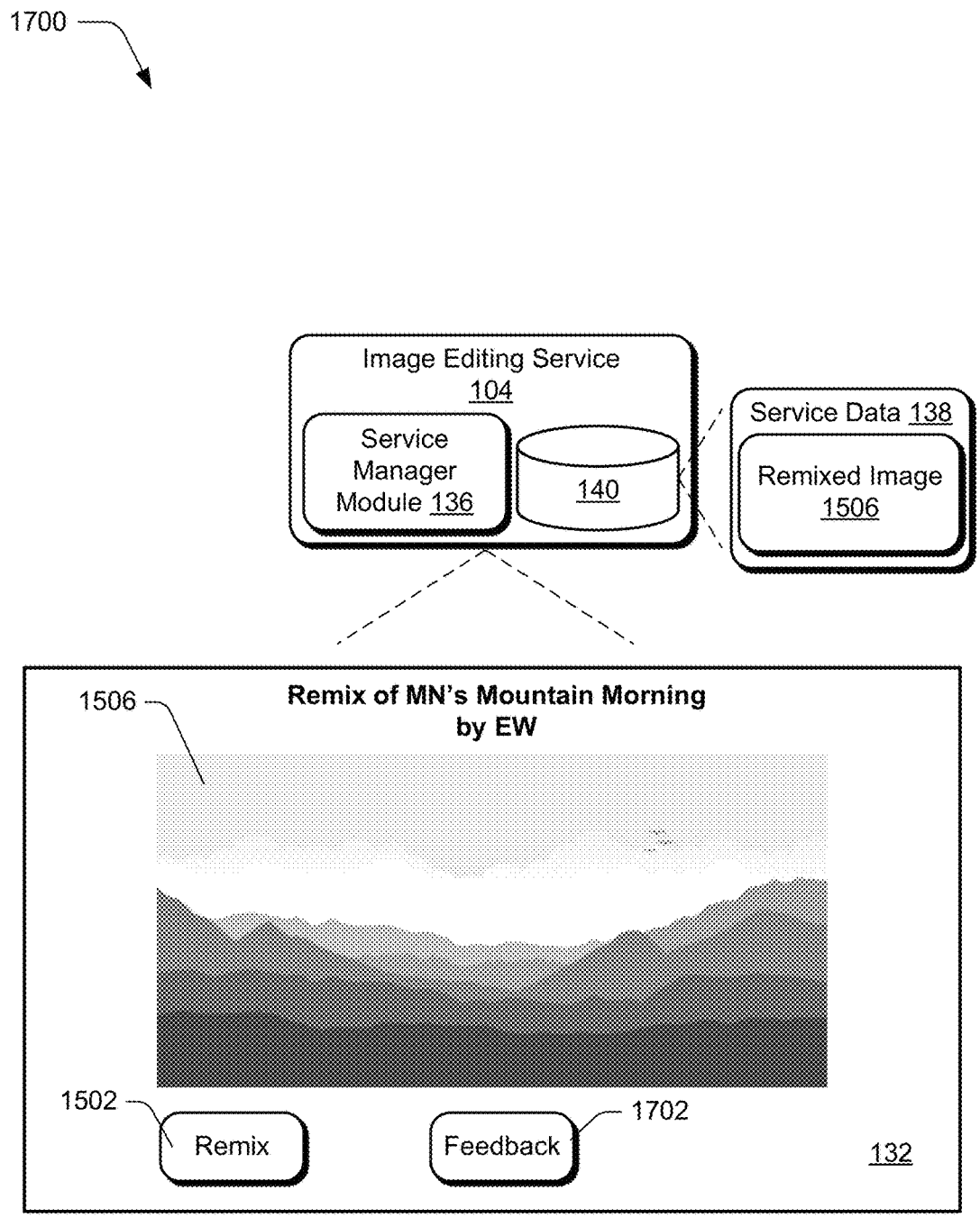
FIG. 17 depicts a scenario for interacting with a remixed digital image.

FIGS. 15-17 depicts different scenarios for presenting a remix experience for an edited digital image. In FIG. 15, a scenario 1500 is depicted that provides a remix experience. The scenario 1500 includes the edited image 116a displayed in the image editor GUI 132, along with a remix control 1502. In response to selection of the remix control 1502, a remix experience 1504 is launched. Generally, the remix experience 1504 enables a user to apply edits to the edited digital image 114a to "remix" the image. Accordingly, the edit controls 302 are populated to the image editor GUI 132, and a user manipulates the edit controls 302 to generate a remixed digital image ("remixed image") 1506 that reflects edits applied to the edited image 116a via manipulation of the edit controls 302. The user then selects a done control 1508, which applies the edits to store the remixed image 1506. In at least one implementation, the remixed image 1506 is stored in the edited images 116 as a remixed version of the edited image 116a.

FIG. 16 depicts a scenario 1600 for publishing a remixed image. The scenario 1600, for instance, represents a continuation of the scenario 1500 discussed above. In the scenario 1600, the remixed image 1506 is displayed in the image editor GUI 132, along with a publish control 1602. The publish control 1602 is selectable to cause the remixed image 1506 to be published to a different platform, such as the image editing service 104. Accordingly, the user selects the publish control 1602, which causes the remixed image 1506 to be communicated to the image editing service 104 such that other users may access and interact with the remixed image 1506.

FIG. 17 depicts a scenario 1700 for interacting with a remixed digital image. The scenario 1700, for instance, represents a continuation of the scenarios 1500, 1600, detailed above. In the scenario, a user accesses the remixed image 1506 from the image editing service 104. For instance, the user leverages the image editor GUI 132 to browse digital images available from the image editing service 104, and selects the remixed image 1506. In at least one implementation, the user represents a different user than the user that generated the remixed image 1506.

The image editor GUI 132 includes the remix control 1502 which is selectable to initiate a further remix experience using the remixed image 1506, and a feedback control 1702 which is selectable to enable the user to provide feedback regarding the remixed image 1506. For instance, selecting the feedback control 1702 causes a feedback experience (e.g., a digital feedback form) to be presented that enables the user to input feedback about the remixed image 1506. Generally, the feedback may indicate a user impression of the remixed image 1506, such as positive or negative feedback. The feedback may then be published, such as to the image editing service 104 and/or to the user that generated the remixed image 1506.

Figure 18:
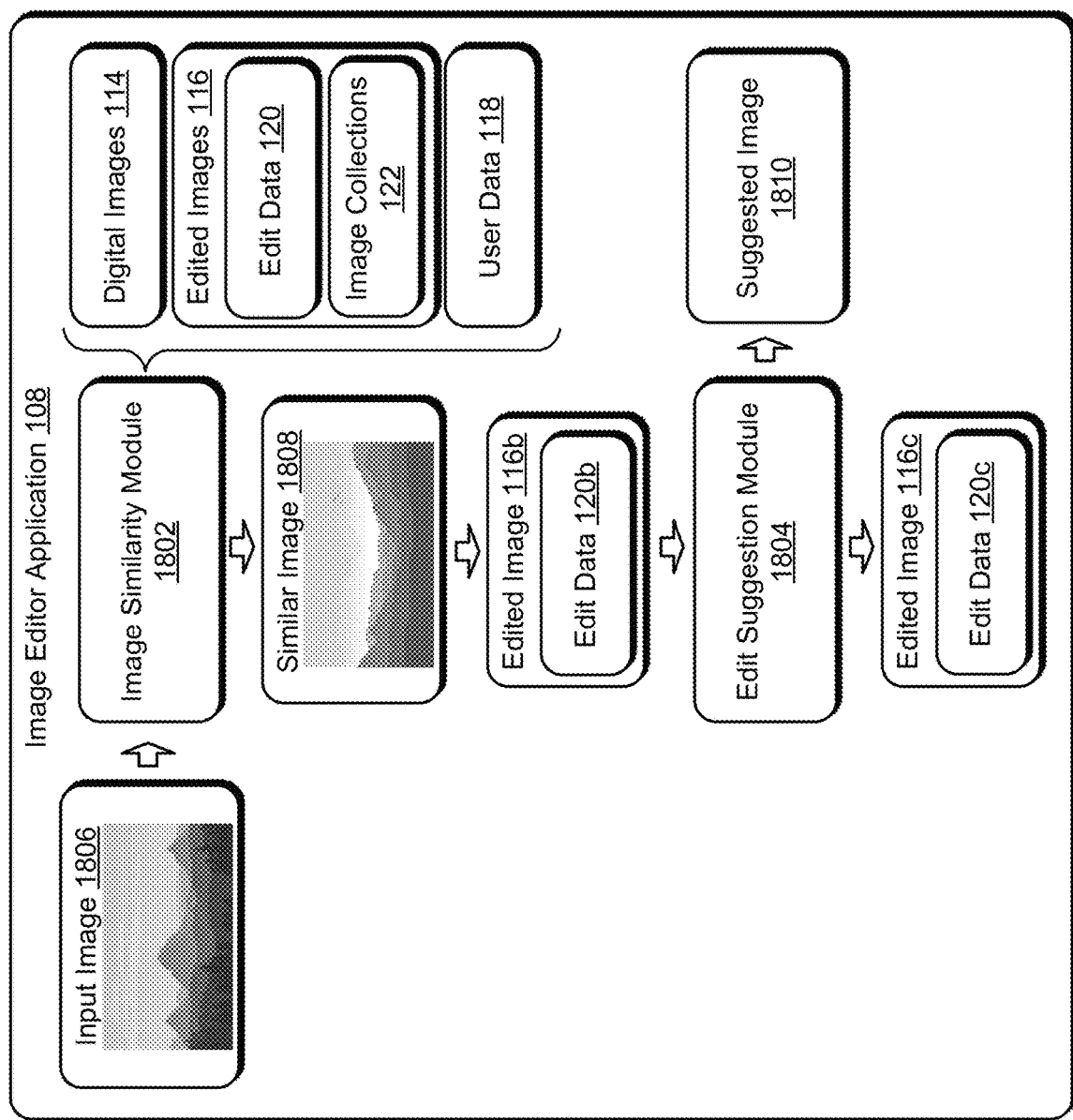
FIG. 18 depicts an image editor system that enables edits to be suggested for a digital image.

FIG. 18 depicts an image editor system 1800 in an example implementation in which the image editor application 108 enables edits to be suggested for a digital image. In the system 1800, the image editor application 108 includes an image similarity module 1802 and an edit suggestion module 1804. The image similarity module 1802 is representative of functionality to process digital images and determine visual similarity between the digital images. Generally, image similarity can be determined in different ways, such as by comparing different attributes of digital images such as shape, color, aspect ratio, and so forth. The image similarity module 1802, for instance, determines a similarity between two digital images by comparing common nodal points (e.g., pixel positions) between each of the images, and generating a similarity score that indicates a relative amount of similarity between the images. In at least one implementation, a similarity threshold is defined such that images with a similarity score that meets or exceeds the similarity score are designated as similar images. However, images that fall below the similarity threshold can be designated as dissimilar images.

The edit suggestion module 1804 is representative of functionality to suggest edits that can be applied to digital images. The edit suggestion module 1804, for example, can suggest edits to a digital image based on edits applied to other, visually similar images identified by the image similarity module 1802.

Further to the image editor system 1800, an input digital image ("input image") 1806 is input to the image editor application 108, such as based on user input requesting suggested edits for the input image 1806. The image similarity module 1802 compares the input image 1806 to the digital images 114, and identifies a similar digital image ("similar image") 1808 that is visually similar to the input image 1806. The image similarity module 1802, for instance, performs similarity analysis between the input image 1806 and a set of the digital images 114, and generates a similarity score for each of the digital images 114. The image similarity module 1802 then selects the similar image 1808 based on its similarity score. The similar image 1808, for instance, has a highest similarity score from among the analyzed set of digital images.

Utilizing the similar image 1808, the edit suggestion module 1804 locates an edited image 116b that was previously generated from the similar image 1808. The similar image 1808, for example, represents a source digital image to which various edits were applied to generate the edited image 116b. The edited image 116b includes edit data 120b that describes how the similar image 1808 was edited to generate the edited image 116b. The edit data 120b, for instance, describes which visual attributes of the similar image 1808 were edited, and to what degree the attributes were edited. In at least one implementation, the edited image 116b represents an image generated and/or utilized as part of an edit experience as described herein.

Continuing, the image editor application 108 applies the edit data 120b to the input image 1806 to generate a suggested image 1610, which represents the input image 1806 as transformed using edits from the edit data 120b. In at least one implementation, the suggested image 1610 can be displayed as a suggestion for editing the input image 1806. Accordingly, and based on the suggested image 1610, an edited image 116c is generated by applying the edit data 120b to the input image 1806. For instance, a user provides input indicating acceptance of the suggested image 1610, and thus the edited image 116c is generated. The edited image 116c further includes edit data 120c that indicates edits applied to the input image 1806 to generate the edited image 116c. Generally, the edited image 116c may be leveraged in various ways, such as to generate various edit experiences and remix experiences described herein.

Figure 19:
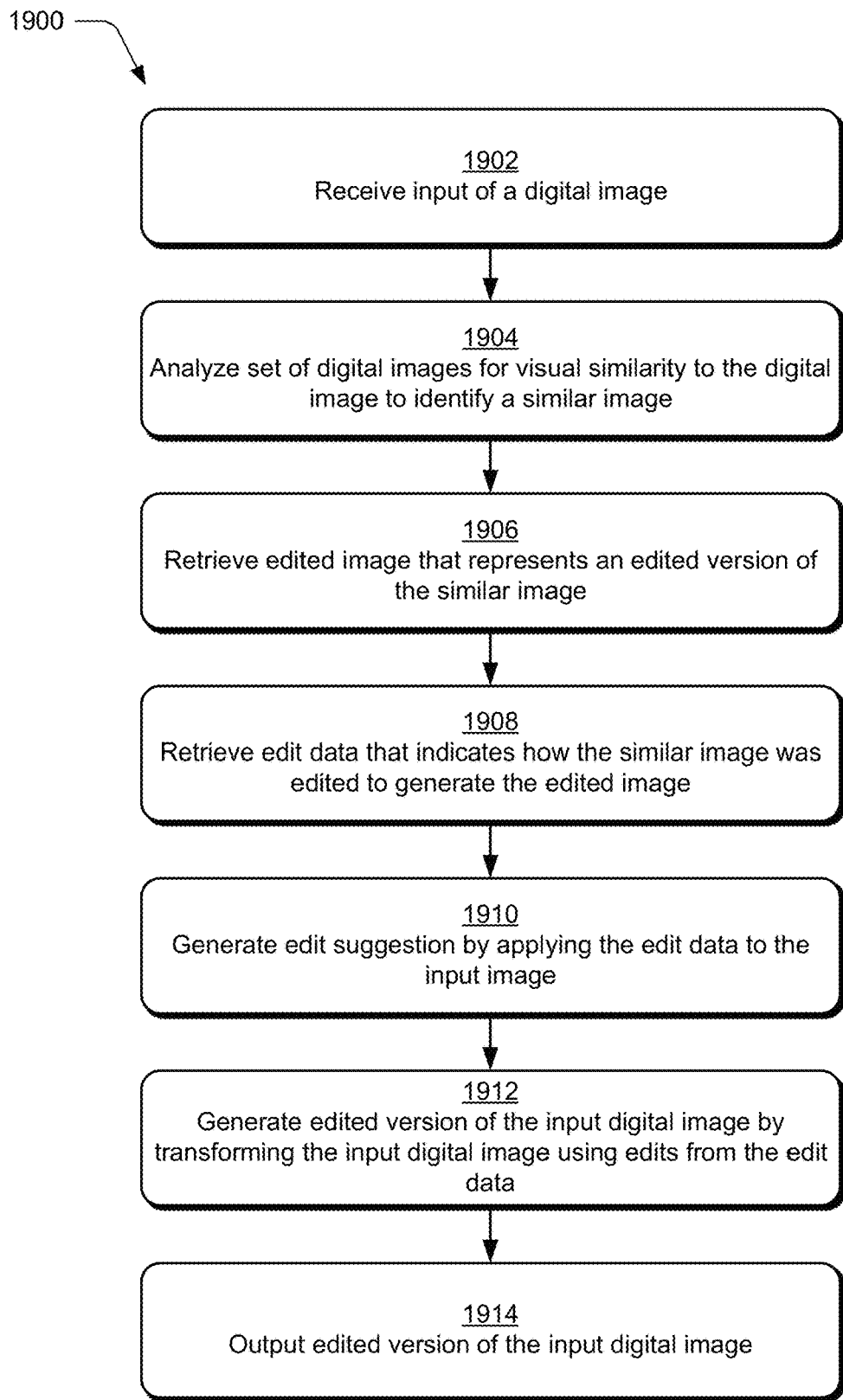
FIG. 19 depicts an example procedure for transforming a digital image based on edits to a similar digital image.

FIG. 19 depicts an example procedure 1900 for transforming a digital image based on edits to a similar digital image. Input of a digital image is received (block 1902). A user, for instance, selects a digital image 114 for editing via the image editor application 108. A set of digital images is analyzed for visual similarity to the digital image to identify a similar image (block 1904). For example, the image similarity module 1802 performs a visual similarity analysis by comparing the input digital image to the digital images 114. As mentioned above, the similarity analysis can compare various visual attributes to determine visual similarity of visual objects in the respective images, such as shape similarity between objects in the digital images, size similarity, color similarity, and so forth.

In at least one implementation, multiple similar visual images may be identified and utilized to generate different edit suggestions for presentation to a user. Alternatively or additionally, if multiple similar visual images are identified, a particular similar image may be selected for use based on a particular criteria, such as feedback received regarding the particular similar image. For instance, if the particular similar image is determined to have more positive feedback than the other identified similar images (e.g., more "likes"), the particular similar image is selected. In another implementation, the similar image may be selected based on a reputation of a creating user that edits the image to generate an edited version of the image. For instance, the creating user is designated by the image editing service 104 as a popular creator, such as based on feedback received regarding the user's editing projects, a number of users that subscribe to receive the user's content and/or that view the user's content, and so forth. Thus, the similar image associated with the creating user can be selected based on the creating user's popularity with the image editing service 104.

An edited image that represents an edited version of the similar image is retrieved (block 1906). The image similarity module 1802, for instance, searches the edited images 116 for an edited image that uses the similar image as a source image. For example, instances of the edited images 116 identify respective instances of the digital images 114 that are used as source images.

Edit data that indicates how the similar image was edited to generate the edited image is retrieved (block 1908). For example, the image similarity module 1802 retrieves edit data 120 for the retrieved edited image 116. In at least one implementation, the edit data 120 is stored as part of the edited image 116, and/or as a separate file that is linked to the edited image.

An edit suggestion is generated by applying the edit data to the input image (block 1910). The edit suggestion module 1804, for instance, presents an edit preview by applying the edit data 120 to the input image and displaying the edit preview. In at least one implementation, multiple edited versions of the similar image may be identified, such as different versions created by different respective users. Thus, multiple different edit suggestions can be presented for the different edited version. Alternatively or additionally, a particular edited version can be selected for suggestion, such as based on feedback regarding the particular edited version, reputation of a user that generated the edited version, and so forth.

An edited version of the input digital image is generated by transforming the input digital image using edits from the edit data (block 1912). For instance, a user accepts the edit suggestion, and the image editor application 108 generates an edited version of the input image by applying the edit data to the input image.

The edited version of the input digital image is output (block 1914). The image editor application 108, for example, displays the edited version in the image editor GUI 132. In at least some implementations, the edited version of the input digital image can be used for various purposes, such as generating edit experiences and remix experiences described herein.

Discussed above are a number of procedures. Aspects of the procedures described herein may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the client device 102, the image editing service 104, and/or via cooperation between the client device 102 and the image editing service 104.

Having described example scenarios and procedures in accordance with one or more implementations, consider now an example system and device that can be utilized to implement the various techniques described herein.

Example System and Device

Figure 20:
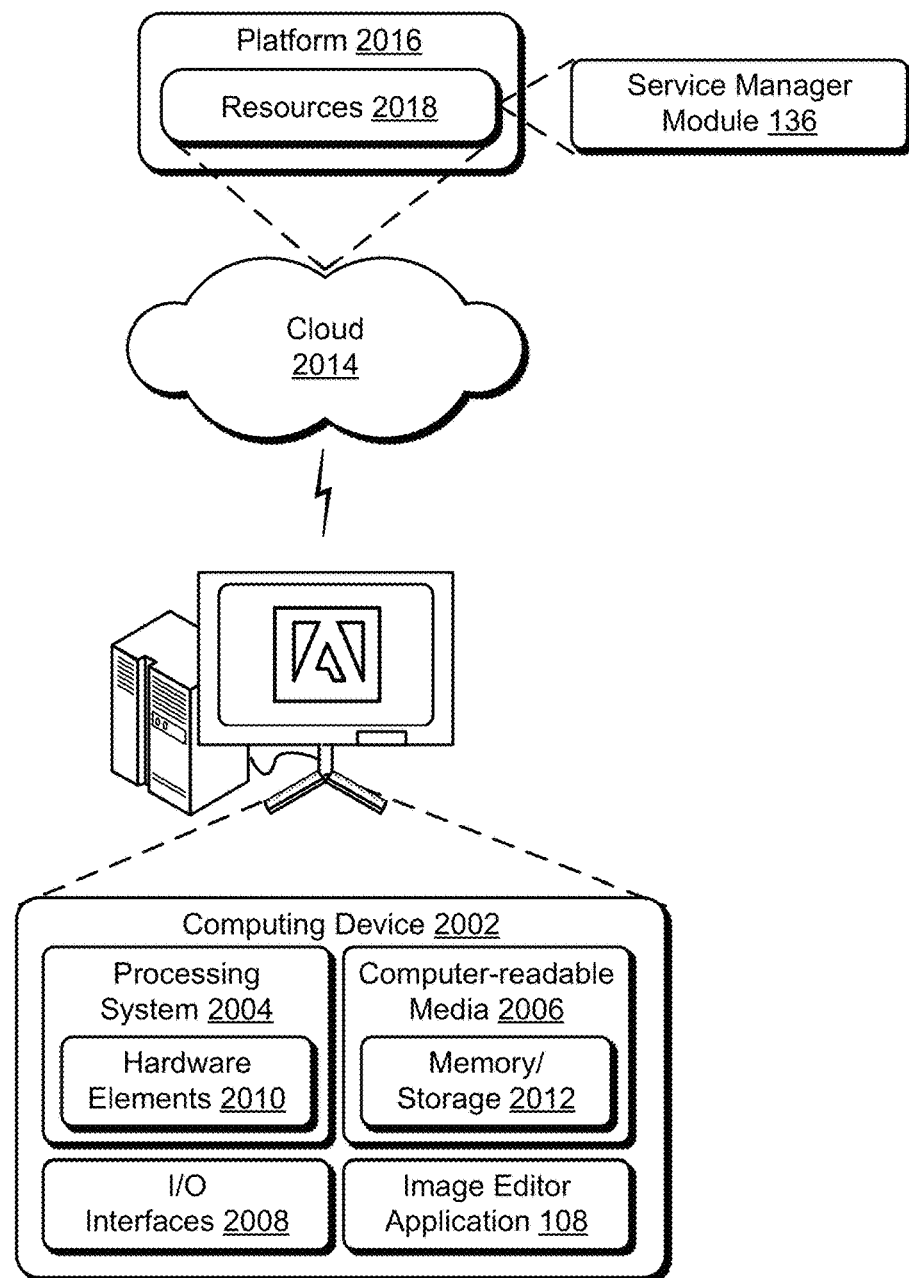
FIG. 20 illustrates an example system including various components of an example device that can be implemented as any type of computing device as described and/or utilized with reference to FIGS. 1-19 to implement embodiments of the techniques described herein.

FIG. 20 illustrates an example system generally at 2000 that includes an example computing device 2002 that is representative of one or more computing systems and/or devices that may implement the various techniques described herein. This is illustrated through inclusion of the image editor application 108 and the service manager module 136. The computing device 2002 may be, for example, a server of a service provider, a device associated with a client (e.g., a client device), an on-chip system, and/or any other suitable computing device or computing system.

The example computing device 2002 as illustrated includes a processing system 2004, one or more computer-readable media 2006, and one or more I/O interfaces 2008 that are communicatively coupled, one to another. Although not shown, the computing device 2002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2004 is representative of functionality to perform one or more operations using hardware. Accordingly, the processing system 2004 is illustrated as including hardware elements 2010 that may be configured as processors, functional blocks, and so forth. This may include implementation in hardware as an application specific integrated circuit or other logic device formed using one or more semiconductors. The hardware elements 2010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 2006 is illustrated as including memory/storage 2012. The memory/storage 2012 represents memory/storage capacity associated with one or more computer-readable media. The memory/storage component 2012 may include volatile media (such as random access memory (RAM)) and/or nonvolatile media (such as read only memory (ROM), Flash memory, optical disks, magnetic disks, and so forth). The memory/storage component 2012 may include fixed media (e.g., RAM, ROM, a fixed hard drive, and so on) as well as removable media (e.g., Flash memory, a removable hard drive, an optical disc, and so forth). The computer-readable media 2006 may be configured in a variety of other ways as further described below.

Input/output interface(s) 2008 are representative of functionality to allow a user to enter commands and information to computing device 2002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2010 and computer-readable media 2006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2010. The computing device 2002 may be configured to implement particular instructions and/or functions corresponding to the software and/or hardware modules. Accordingly, implementation of a module that is executable by the computing device 2002 as software may be achieved at least partially in hardware, e.g., through use of computer-readable storage media and/or hardware elements 2010 of the processing system 2004. The instructions and/or functions may be executable/operable by one or more articles of manufacture (for example, one or more computing devices 2002 and/or processing systems 2004) to implement techniques, modules, and examples described herein.

The techniques described herein may be supported by various configurations of the computing device 2002 and are not limited to the specific examples of the techniques described herein. This functionality may also be implemented all or in part through use of a distributed system, such as over a "cloud" 2014 via a platform 2016 as described below.

The cloud 2014 includes and/or is representative of a platform 2016 for resources 2018. The platform 2016 abstracts underlying functionality of hardware (e.g., servers) and software resources of the cloud 2014. The resources 2018 may include applications and/or data that can be utilized while computer processing is executed on servers that are remote from the computing device 2002. Resources 2018 can also include services provided over the Internet and/or through a subscriber network, such as a cellular or Wi-Fi network.

The platform 2016 may abstract resources and functions to connect the computing device 2002 with other computing devices. The platform 2016 may also serve to abstract scaling of resources to provide a corresponding level of scale to encountered demand for the resources 2018 that are implemented via the platform 2016. Accordingly, in an interconnected device embodiment, implementation of functionality described herein may be distributed throughout the system 2000. For example, the functionality may be implemented in part on the computing device 2002 as well as via the platform 2016 that abstracts the functionality of the cloud 2014.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device, the method comprising:
    receiving, by the at least one computing device, a selection of an instance of edited digital content;
    presenting, by the at least one computing device, a graphical user interface (GUI) that includes an instance of source digital content that was used to generate the edited digital content;
    retrieving, by the at least one computing device, edit data that describes edits that were applied to the source digital content to generate the edited digital content, and configuration data that describes manipulation of a set of edit controls as part of applying the edits to the source digital content;
    applying, by the at least one computing device, the configuration data to visually configure the set of edit controls in the GUI to identify a default position for each edit control and an edit position to which each edit control is manipulable to edit the source digital content and generate the edited digital content;
    causing, by the at least one computing device, each edit control of the set of edit controls to be visually manipulated in the GUI from the default position to the edit position to cause content edits specified in the edit data to be applied to the source digital content; and
    transforming, by the at least one computing device, the source digital content by applying the content edits to the source digital content to transform the source digital content into the edited digital content.

2. A method as described in claim 1, wherein said presenting the GUI that includes the instance of source digital content is performed in response to user input requesting an edit experience that identifies how the edited digital content is generated from the source digital content.

3. A method as described in claim 1, wherein the individual edit controls represent different respective visual attributes of the source digital content, and wherein the default position for each edit control represents a value for a respective visual attribute for the source digital content.

4. A method as described in claim 1, wherein said causing each edit control to be manipulated from the default position to the edit position is based on user input to manipulate each edit control.

5. A method as described in claim 1, further comprising displaying, adjacent one or more of the edit controls, a control prompt that includes information about the one or more edit controls, and wherein said causing the one or more edit controls to be manipulated from the default position to the edit position is based on user input to the control prompt.

6. A method as described in claim 1, wherein said causing each edit control to be manipulated from the default position to the edit position comprises an automated manipulation of the edit controls that proceeds sequentially through the edit controls.

7. A method as described in claim 1, further comprising storing, by the at least one computing device, the content edits specified in the edit data as edit presets that are applicable to edit other digital content.

8. A method as described in claim 1, wherein said causing each edit control of the set of edit controls to be visually manipulated in the GUI from the default position to the edit position occurs according to a first type of edit experience, the method further comprising:
    detecting, by the at least one computing device, a switch event indicating a request to switch to different type of edit experience; and
    performing, by the at least one computing device, a switch from the first type of edit experience to a second, different type of edit experience.

9. A system comprising:
    at least one processor; and
    a non-transitory memory having stored thereon computer-readable instructions that are executable by the at least one processor to perform operations comprising:
        displaying a graphical user interface (GUI) that includes source digital content and a set of edit controls that are manipulable to edit attributes of the source digital content;
        receiving input to manipulate one or more of the edit controls from a default setting to an edit setting to edit one or more of the attributes of the source digital content and generate edited digital content;
        generating edit data that describes the edited one or more attributes of the edited digital content, and configuration data that describes a visual configuration of the one or more edit controls based on the edit setting; and
        generating output data that is executable, as part of a subsequent interaction with the source digital content, to apply the configuration data to visually configure the edit controls in the GUI while applying the edit data to transform the source digital content into the edited digital content.

10. A system as described in claim 9, wherein said generating the output data is based on user input indicating that an edit experience is to be generated based on the edited digital content, and wherein the output data represents at least a portion of the edit experience.

11. A system as described in claim 9, wherein the input further identifies whether the edit experience is to be generated as an interactive edit experience, or an automated replay edit experience.

12. A system as described in claim 9, wherein the configuration data further describes the visual configuration of the one or more edit controls based on the default setting.

13. A system as described in claim 9, wherein the operations further comprise receiving input to change a visual position of the edit controls in the GUI, and wherein the output data is executable to apply the configuration data to visually configure the edit controls in the GUI based on the changed visual position of the edit controls.

14. A system as described in claim 9, wherein the operations further comprise generating a control prompt adjacent the one or more edit controls, receiving user input of text content to the control prompt, and wherein the control prompt with the text content is included with the output data for output during the subsequent interaction with the source digital content.

15. A system as described in claim 14, wherein the control prompt further includes default content that pertains to the one or more edit controls.

16. A system as described in claim 14, wherein the control prompt further includes a selectable control that is selectable to transition between the edit controls as part of the subsequent interaction with the source digital content.

17. A system as described in claim 9, wherein the output data is executable to apply the configuration data to visually configure the edit controls in the GUI via an automated manipulation of the edit controls as part of the subsequent interaction with the source digital content.

18. A method implemented by at least one computing device, the method comprising:
   displaying, by the at least one computing device, a graphical user interface (GUI) that includes source digital content and a set of edit controls that are manipulable to edit attributes of the source digital content;
   receiving, by the at least one computing device, input to manipulate one or more of the edit controls from a default setting to an edit setting to edit one or more of the attributes of the source digital content and generate edited digital content;
   generating, by the at least one computing device, edit data that describes the edited one or more attributes of the edited digital content, and configuration data that describes a visual configuration of the one or more edit controls based on the edit setting; and
   generating, by the at least one computing device, output data that is executable, as part of a subsequent interaction with the source digital content, to apply the configuration data to visually configure the edit controls in the GUI while applying the edit data to transform the source digital content into the edited digital content.

19. A method as described in claim 18, wherein the input further identifies whether the edit experience is to be generated as an interactive edit experience, or an automated replay edit experience.

20. A method as described in claim 18, wherein the output data is executable to apply the configuration data to visually configure the edit controls in the GUI via an automated manipulation of the edit controls as part of the subsequent interaction with the source digital content.

\* \* \* \* \*